United States Patent
Ishikawa et al.

(10) Patent No.: US 10,886,529 B2
(45) Date of Patent: Jan. 5, 2021

(54) POSITIVE ELECTRODE ACTIVE MATERIAL CONTAINING LITHIUM COMPOSITE OXIDE AND COVERING MATERIAL AND BATTERY

(71) Applicant: Panasonic Intellectual Property Management Co., Ltd., Osaka (JP)

(72) Inventors: Takayuki Ishikawa, Osaka (JP); Ryuichi Natsui, Osaka (JP); Issei Ikeuchi, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 16/214,208

(22) Filed: Dec. 10, 2018

(65) Prior Publication Data

US 2019/0221838 A1    Jul. 18, 2019

(30) Foreign Application Priority Data

Jan. 17, 2018  (JP) ................................. 2018-005269

(51) Int. Cl.
    *H01M 4/00*    (2006.01)
    *H01M 4/36*    (2006.01)
    (Continued)

(52) U.S. Cl.
    CPC ........ *H01M 4/366* (2013.01); *C01G 45/1228* (2013.01); *C01G 51/50* (2013.01);
    (Continued)

(58) Field of Classification Search
    CPC ............ C01P 2002/76; C01P 2004/84; H01M 2300/0065; H01M 4/366; H01M 4/62; C01G 51/50
    See application file for complete search history.

(56) References Cited

U.S. PATENT DOCUMENTS 9,570,734 B2 †  2/2017  Kelder
2011/0099798 A1 †  5/2011  Nilsen
(Continued)

FOREIGN PATENT DOCUMENTS

JP    2008-127211    6/2008
JP    2008-156163    7/2008
(Continued)

*Primary Examiner* — Cynthia H Kelly
*Assistant Examiner* — Monique M Wills
(74) *Attorney, Agent, or Firm* — McDermott Will and Emery LLP

(57) ABSTRACT

A positive electrode active material includes a lithium composite oxide and a covering material that covers a surface of the lithium composite oxide. The covering material has an electron conductivity of $10^6$ S/m or less. The lithium composite oxide is a multiphase mixture including a first phase having a first crystal structure that belongs to a space group Fm-3m and a second phase having a second crystal structure that belongs to a space group other than a space group Fm-3m. The ratio $I_{(18°-20°)}/I_{(43°-46°)}$ of a first integrated intensity $I_{(18°-20°)}$ of a first maximum peak present at a first diffraction angle $2\theta$ of 18° or more and 20° or less to a second integrated intensity $I_{(43°-46°)}$ of a second maximum peak present at a second diffraction angle $2\theta$ of 43° or more and 46° or less in an XRD pattern of the lithium composite oxide satisfies $0.05 \leq I_{(18°-20°)}/I_{(43°-46°)} \leq 0.90$.

22 Claims, 2 Drawing Sheets

(51) Int. Cl.
  *H01M 4/505*    (2010.01)
  *H01M 4/525*    (2010.01)
  *H01M 4/48*     (2010.01)
  *H01M 10/0525*  (2010.01)
  *C01G 45/12*    (2006.01)
  *H01M 4/62*     (2006.01)
  *C01G 53/00*    (2006.01)
  *C01G 51/00*    (2006.01)
  *H01M 4/02*     (2006.01)

(52) U.S. Cl.
  CPC ............ *C01G 53/50* (2013.01); *H01M 4/483* (2013.01); *H01M 4/505* (2013.01); *H01M 4/525* (2013.01); *H01M 4/62* (2013.01); *H01M 10/0525* (2013.01); *C01P 2002/72* (2013.01); *C01P 2002/74* (2013.01); *C01P 2002/76* (2013.01); *C01P 2004/84* (2013.01); *C01P 2006/40* (2013.01); *H01M 2004/028* (2013.01); *H01M 2300/004* (2013.01); *H01M 2300/0034* (2013.01); *H01M 2300/0065* (2013.01)

(56) References Cited

U.S. PATENT DOCUMENTS

| | | |
|---|---|---|
| 2011/0294006 A1† | 12/2011 | Amine |
| 2011/0311882 A1† | 12/2011 | Kim |
| 2014/0099549 A1 | 4/2014 | Ceder et al. |
| 2016/0351973 A1† | 12/2016 | Albano |
| 2017/0155133 A1* | 6/2017 | Lee .................. H01M 4/505 |
| 2018/0090747 A1 | 3/2018 | Natsui et al. |
| 2018/0145368 A1* | 5/2018 | Ochiai ............... H01M 4/02 |

FOREIGN PATENT DOCUMENTS

| | | |
|---|---|---|
| JP | 2010-135187 | 6/2010 |
| JP | 2012-041257 | 3/2012 |
| JP | 2015-535801 | 12/2015 |
| JP | 2016-103456 | 6/2016 |
| WO | 2017/013848 | 1/2017 |
| WO | 2017143329 A1† | 8/2017 |
| WO | 2018/163519 | 9/2018 |

\* cited by examiner
† cited by third party

POSITIVE ELECTRODE ACTIVE MATERIAL CONTAINING LITHIUM COMPOSITE OXIDE AND COVERING MATERIAL AND BATTERY

BACKGROUND

1. Technical Field

The present disclosure relates to a positive electrode active material for batteries and a battery.

2. Description of the Related Art

Japanese Unexamined Patent Application Publication No. 2008-156163 discloses a spinel lithium manganese oxide which has a chemical composition represented by general formula $Li_{1+x}M_yMn_{2-x-y}O_4$ and in which the maximum particle diameter $D_{100}$ is 15 μm or less, the full width at half maximum of a (400) plane in X-ray diffraction is 0.30 or less, and the ratio $I_{400}/I_{111}$ of a peak intensity $I_{400}$ of the (400) plane to a peak intensity $I_{111}$ of a (111) plane is 0.33 or more. Herein, M represents one or more metal elements selected from Al, Co, Ni, Mg, Zr, and Ti, x is in the range of 0≤x≤0.33, and y is in the range of 0≤y≤0.2.

SUMMARY

In one general aspect, the techniques disclosed here feature a positive electrode active material including: a lithium composite oxide and a covering material that covers a surface of the lithium composite oxide. The covering material has an electron conductivity of $10^6$ S/m or less. The lithium composite oxide is a multiphase mixture including a first phase having a first crystal structure that belongs to a space group Fm-3m and a second phase having a second crystal structure that belongs to a space group other than a space group Fm-3m. The ratio $I_{(18°-20°)}/I_{(43°-46°)}$ of a first integrated intensity $I_{(18°-20°)}$ of a first maximum peak present at a first diffraction angle 2θ of 18° or more and 20° or less to a second integrated intensity $I_{(43°-46°)}$ of a second maximum peak present at a second diffraction angle 2θ of 43° or more and 46° or less in an XRD pattern of the lithium composite oxide satisfies $0.05 \leq I_{(18°-20°)}/I_{(43°-46°)} \leq 0.90$.

General or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
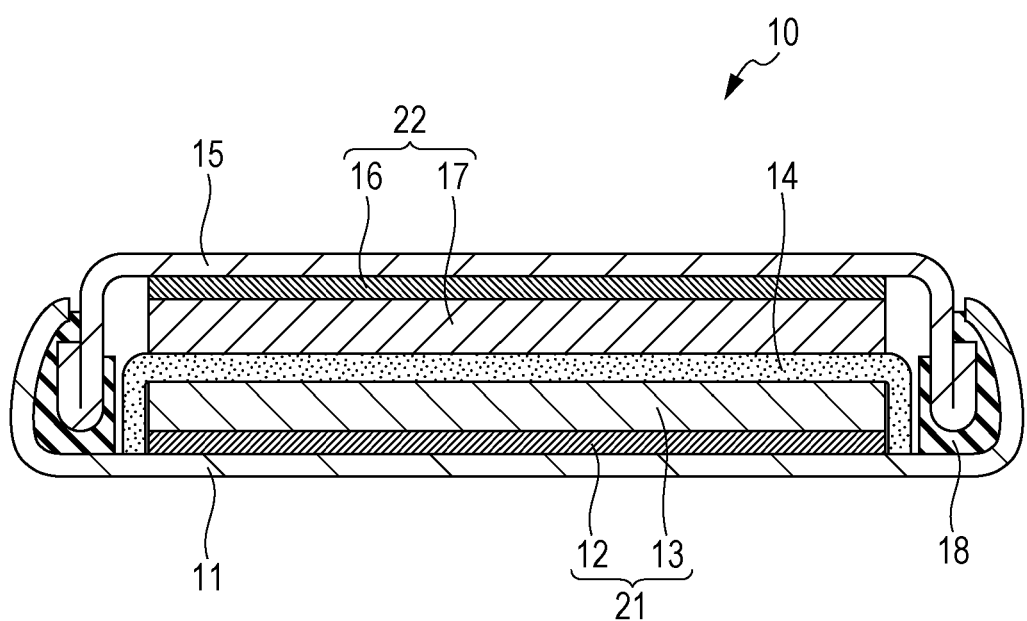
FIG. 1 is a sectional view illustrating a schematic structure of a battery that is an example of a battery according to a second embodiment.

Hereafter, embodiments of the present disclosure will be described.

First Embodiment

A positive electrode active material according to a first embodiment contains a lithium composite oxide and a covering material that covers a surface of the lithium composite oxide and has an electron conductivity of $10^6$ S/m or less. The lithium composite oxide is a multiphase mixture including a first phase having a crystal structure that belongs to a space group Fm-3m and a second phase having a crystal structure that belongs to a space group other than a space group Fm-3m. The integrated intensity ratio $I_{(18°-20°)}/I_{(43°-46°)}$ of a maximum peak present at a diffraction angle 2θ of 18° or more and 20° or less to a maximum peak present at a diffraction angle 2θ of 43° or more and 46° or less in an XRD pattern satisfies $0.05 \leq I_{(18°-20°)}/I_{(43°-46°)} \leq 0.90$.

This configuration can provide batteries having good cycle characteristics.

The term "batteries having good cycle characteristics" refers to batteries having a high capacity retention even after a charge-discharge cycle is repeatedly performed a plurality of times. In other words, the batteries having good cycle characteristics are batteries whose capacity does not considerably decrease even after a charge-discharge cycle is repeatedly performed a plurality of times.

In the case where, for example, a lithium ion battery is produced using the above-described positive electrode active material, the lithium ion battery has an oxidation-reduction potential (based on Li/Li$^+$) of about 3.4 V. In the lithium ion battery, the capacity retention after 20 cycles of a charge-discharge test is about 80% or more.

The lithium composite oxide according to the first embodiment includes a first phase having a crystal structure that belongs to a space group Fm-3m and a second phase having a crystal structure that belongs to a space group other than a space group Fm-3m.

The crystal structure that belongs to a space group Fm-3m is a distorted rock-salt structure in which lithium and "cation elements such as transition metals" are randomly arranged. Therefore, the crystal structure that belongs to a space group Fm-3m can occlude a larger amount of Li therein than LiCoO$_2$, which is a typical known material. However, the crystal structure that belongs to a space group Fm-3m has low Li diffusibility because Li diffuses only through adjacent Li or vacancies.

On the other hand, the crystal structure that belongs to a space group (e.g., Fd-3m, R-3m, or C2/m) other than a space group Fm-3m has high Li diffusibility because two-dimensional Li diffusion paths are present. The crystal structure that belongs to a space group other than a space group Fm-3m is a stable crystal structure because a network of transition metal-anion octahedron is strong.

In a crystal of the lithium composite oxide according to the first embodiment, the crystal structures that belong to both space groups are present in a mixed manner, and thus batteries having high capacity can be provided. Furthermore, long-life batteries are also believed to be provided.

In the lithium composite oxide according to the first embodiment, a plurality of regions constituted by the first phase and a plurality of regions constituted by the second phase may be three-dimensionally arranged in a random manner.

This configuration increases the number of three-dimensional Li diffusion paths, which allows a larger amount of Li to be intercalated and deintercalated. Thus, batteries having higher capacity can be provided.

The lithium composite oxide according to the first embodiment may have a domain structure in which a certain atom is shared within the same particle.

This configuration increases the number of three-dimensional Li diffusion paths, which allows a larger amount of Li to be intercalated and deintercalated. Thus, batteries having higher capacity can be provided.

The lithium composite oxide according to the first embodiment is a multiphase mixture. For example, a layer structure including a bulk layer and a coating layer that coats the bulk layer does not correspond to the multiphase mixture in the present disclosure. The multiphase mixture refers to a substance including a plurality of phases, and is not limited to the case where a plurality of materials corresponding to such phases are mixed with each other during production.

The lithium composite oxide can be identified to be a multiphase mixture by X-ray diffraction measurement and electron diffraction measurement as described later. Specifically, when a spectrum obtained by measuring a certain lithium composite oxide includes peaks that indicate characteristics of a plurality of phases, the lithium composite oxide is judged to be a multiphase mixture.

This configuration increases the number of three-dimensional Li diffusion paths, which allows a larger amount of Li to be intercalated and deintercalated. Thus, batteries having higher capacity can be provided.

In the lithium composite oxide according to the first embodiment, the second phase may have a crystal structure that belongs to one or more space groups selected from the group consisting of Fd-3m, R-3m, and C2/m.

This configuration can provide batteries having higher capacity.

In the lithium composite oxide according to the first embodiment, the second phase may have a crystal structure that belongs to a space group Fd-3m, R-3m, or C2/m. That is, the lithium composite oxide according to the first embodiment may be a two-phase mixture including the first phase and the second phase.

In the lithium composite oxide according to the first embodiment, the second phase may have a crystal structure that belongs to a space group Fd-3m.

This configuration can provide batteries having higher capacity. In the crystal structure (spinel structure) that belongs to a space group Fd-3m, a transition metal-anion octahedron serving as a pillar forms a three-dimensional network. On the other hand, in the crystal structure (layered structure) that belongs to a space group R-3m or C2/m, a transition metal-anion octahedron serving as a pillar forms a two-dimensional network. Therefore, when the second phase has a crystal structure (spinel structure) that belongs to a space group Fd-3m, the structure does not readily become unstable during charge and discharge, which further increases the discharge capacity.

In the lithium composite oxide according to the first embodiment, the integrated intensity ratio $I_{(18°\text{-}20°)}/I_{(43°\text{-}46°)}$ of a maximum peak present at a diffraction angle 2θ of 18° or more and 20° or less to a maximum peak present at a diffraction angle 2θ of 43° or more and 46° or less in an X-ray diffraction (XRD) pattern satisfies $0.05 \leq I_{(18°\text{-}20°)}/I_{(43°\text{-}46°)} \leq 0.90$.

The integrated intensity ratio $I_{(18°\text{-}20°)}/I_{(43°\text{-}46°)}$ is a parameter that indicates the existence ratio of the first phase and the second phase in the lithium composite oxide according to the first embodiment. The ratio $I_{(18°\text{-}20°)}/I_{(43°\text{-}46°)}$ is believed to decrease as the existence ratio of the first phase increases. The ratio $I_{(18°\text{-}20°)}/I_{(43°\text{-}46°)}$ is believed to increase as the existence ratio of the second phase increases.

In the lithium composite oxide according to the first embodiment, if $I_{(18°\text{-}20°)}/I_{(43°\text{-}46°)}$ is smaller than 0.05, the existence ratio of the second phase decreases and thus the Li diffusibility is believed to decrease, resulting in insufficient capacity.

In the lithium composite oxide according to the first embodiment, if $I_{(18°\text{-}20°)}/I_{(43°\text{-}46°)}$ is larger than 0.90, the existence ratio of the first phase decreases and thus the amount of Li intercalated and deintercalated during charge and discharge is believed to decrease, resulting in insufficient capacity.

As described above, the lithium composite oxide according to the first embodiment includes the first phase and the second phase and $0.05 \leq I_{(18°\text{-}20°)}/I_{(43°\text{-}46°)} \leq 0.90$ is satisfied. Therefore, it is believed that a large amount of Li can be intercalated and deintercalated and the Li diffusibility and the stability of the crystal structure are high. Thus, it is believed that batteries having high capacity can be provided by using the lithium composite oxide according to the first embodiment.

In the lithium composite oxide according to the first embodiment, $0.10 \leq I_{(18°\text{-}20°)}/I_{(43°\text{-}46°)} \leq 0.70$ may be satisfied.

This configuration can provide batteries having higher capacity.

Herein, for example, Japanese Unexamined Patent Application Publication No. 2008-156163 is taken as a related-art example. This document discloses a positive electrode material containing a lithium composite oxide which has a crystal structure that belongs to a space group Fd-3m and in which $2 \leq I_{(18°\text{-}20°)}/I_{(43°\text{-}46°)} \leq 3$ is substantially satisfied. It is mentioned that this configuration considerably suppresses the disturbance of the crystal structure and achieves excellent battery characteristics.

That is, the lithium composite oxide in which $0.05 \leq I_{(18°\text{-}20°)}/I_{(43°\text{-}46°)} \leq 0.90$ is satisfied and which includes not only a crystal structure that belongs to a space group Fd-3m but also a crystal structure that belongs to a space group Fm-3m in a crystal as in the first embodiment of the present disclosure is neither investigated nor suggested in such related art. In other words, the lithium composite oxide according to the first embodiment has a configuration that cannot be easily conceived from the related art, and thus batteries having high capacity are provided.

The integrated intensity of each diffraction peak can be calculated using, for example, software included with an XRD instrument (e.g., PDXL included with a powder X-ray diffraction instrument manufactured by Rigaku Corporation). In this case, the integrated intensity of each diffraction peak can be determined by, for example, calculating an area within ±3° of an angle of each diffraction peak.

In a general CuKα XRD pattern, in the case of the crystal structure that belongs to a space group Fm-3m, peaks are not present at a diffraction angle 2θ of 18° or more and 20° or less, and a maximum peak present at a diffraction angle 2θ of 43° or more and 46° or less corresponds to a (200) plane.

In a general CuKα XRD pattern, in the case of the crystal structure that belongs to a space group Fd-3m, a maximum peak present at a diffraction angle 2θ of 18° or more and 20° or less corresponds to a (111) plane, and a maximum peak present at a diffraction angle 2θ of 43° or more and 46° or less corresponds to a (400) plane.

In a general CuKα XRD pattern, in the case of the crystal structure that belongs to a space group R-3m, a maximum peak present at a diffraction angle 2θ of 18° or more and 20° or less corresponds to a (003) plane, and a maximum peak present at a diffraction angle 2θ of 43° or more and 46° or less corresponds to a (104) plane.

In a general CuKα XRD pattern, in the case of the crystal structure that belongs to a space group C2/m, a maximum peak present at a diffraction angle 2θ of 18° or more and 20° or less corresponds to a (003) plane, and a maximum peak present at a diffraction angle 2θ of 43° or more and 46° or less corresponds to a (104) plane.

Herein, the lithium composite oxide according to the first embodiment includes a first phase having a crystal structure that belongs to a space group Fm-3m and a second phase having a crystal structure that belongs to a space group (e.g., Fd-3m, R-3m, or C2/m) other than a space group Fm-3m.

Therefore, in the lithium composite oxide according to the first embodiment, the complete identification of the space group and Miller index to which each of the maximum peak present at a diffraction angle 2θ of 18° or more and 20° or less and the maximum peak present at a diffraction angle 2θ of 43° or more and 46° or less corresponds is not always easily performed.

In this case, electron diffraction measurement that uses a transmission electron microscope (TEM) can be performed in addition to the above-described X-ray diffraction measurement. By observing an electron diffraction pattern by a publicly known method, the space group of the lithium composite oxide according to the first embodiment can be identified. This confirms that the lithium composite oxide according to the first embodiment includes a first phase having a crystal structure that belongs to a space group Fm-3m and a second phase having a crystal structure that belongs to a space group (e.g., Fd-3m, R-3m, or C2/m) other than a space group Fm-3m.

When a typical positive electrode active material is used at a high potential, the decomposition (e.g., side reaction) of an electrolyte is facilitated, which generates a resistance layer. Furthermore, when a typical positive electrode active material is used at a high potential, anions contained in the positive electrode active material separate in the form of gas. This may degrade the cycle characteristics.

The positive electrode active material according to the first embodiment further contains a covering material in addition to the above-described lithium composite oxide. The covering material covers a surface of the above-described lithium composite oxide. The covering material has an electron conductivity of $10^6$ S/m or less and is a material different from the lithium composite oxide. When the covering material covers a surface of the lithium composite oxide, the contact between the lithium composite oxide and the electrolyte is suppressed. The low electron conductivity of the covering material suppresses the transfer of electrons between the lithium composite oxide and the electrolyte, and the side reactions caused by the transfer of electrons can be suppressed. Thus, the generation of a resistance layer or the separation in the form of gas is suppressed. Therefore, batteries having good cycle characteristics can be provided.

That is, even when the positive electrode active material according to the first embodiment is used at a high potential, batteries having good cycle characteristics can be provided.

In the present disclosure, the phrase "cover a surface" includes a state in which a surface is completely covered and a state in which a surface is partly covered.

In the first embodiment, the mass ratio of the covering material to the above-described lithium composite oxide may be 0.2 or less.

This configuration can suppress the electrochemical inactivation of the surface of the positive electrode active material according to the first embodiment. This can suppress an increase in the resistance. Thus, batteries having higher capacity and better cycle characteristics can be provided.

In the first embodiment, the mass ratio of the covering material to the above-described lithium composite oxide may be 0.01 or more and 0.1 or less.

This configuration can provide batteries having higher capacity and better cycle characteristics.

The covering material according to the first embodiment may cover a surface of the above-described lithium composite oxide with a thickness of 0.1 nm or more and 2.0 nm or less.

This configuration can provide batteries having higher capacity and better cycle characteristics.

When the covering material has a thickness of 0.1 nm or more, the uniformity of the thickness can be improved. Furthermore, when the covering material has a thickness of 0.1 nm or more, the dielectric breakdown can be suppressed.

When the covering material has a thickness of 2.0 nm or less, the inhibition of Li conduction due to the covering material can be suppressed.

The covering material according to the first embodiment may chemically modify a surface of the above-described lithium composite oxide.

The covering material according to the first embodiment may form a solid solution with at least a part of the surface of the above-described lithium composite oxide.

This configuration can provide batteries having better cycle characteristics because elution (e.g., elimination) of metal elements can be further suppressed.

The covering material according to the first embodiment is, for example, an inorganic material.

The covering material according to the first embodiment may be at least one material selected from the group consisting of oxides, halogen compounds, sulfides, and phosphorus compounds.

For example, the halogen compound may be $AlF_3$.

The covering material according to the first embodiment may be a lithium ion conductor.

For example, the lithium ion conductor may be one or more materials selected from the group consisting of $LiBO_2$, $Li_3PO_4$, $LiNbO_3$, $LiNbO_2$, $LiAlO_2$, $Li_2SO_4$, $Li_2MoO_4$, $Li_4SiO_4$, $Li_4FeO_4$, $Li_4ZrO_4$, $Li_2CO_3$, $LiW_2O_7$, $Li_3VO_4$, LiCl, LiBr, LiI, $Li_2Se$, and various lithium ion conductive glasses such as $Li_2O$—$B_2O_3$, $Li_2O$—$Al_2O_3$, $Li_2O$—$SiO_4$, $Li_2O$—$P_2O_5$, LiF—$BF_3$, LiF—$AlF_3$, and LiF—$VF_3$.

This configuration can provide batteries having better cycle characteristics.

The covering material according to the first embodiment may be an oxide.

This configuration can provide batteries having better cycle characteristics. Oxides are chemically stable and have low reactivity with an electrolyte. Therefore, it is believed that by using oxides, the crystal structure is easily maintained in an electrochemical reaction.

The covering material according to the first embodiment may be an oxide represented by composition formula (1) below.

$$Li_aA_bO_c \qquad \text{formula (1)}$$

Herein, A may represent one or more elements selected from the group consisting of Mn, Co, Ni, Fe, Cu, Nb, Mo, Ti, Al, Cr, Zr, Zn, Na, K, Ca, Mg, Pt, Au, B, P, Eu, Sm, Ce, and H.

Furthermore, the following conditions may be satisfied:

0≤a≤3, 0.5≤b≤4, and

1≤c≤4.

This configuration can provide batteries having better cycle characteristics.

The covering material according to the first embodiment may be a Li-containing oxide having high Li conductivity.

For example, the Li-containing oxide may be one or more oxides selected from the group consisting of lithium borate, lithium niobate, lithium cobaltate, lithium titanate, and lithium aluminate.

In this configuration, the diffusibility of Li ions is improved and thus batteries having higher capacity can be provided.

When the covering material according to the first embodiment is capable of occluding Li during charge-discharge reaction, batteries having higher capacity can be provided. In this case, the covering material has a charge-discharge capacity. Therefore, even if the mass ratio of the lithium composite oxide to the entire positive electrode active material is decreased by adding the covering material, high capacity of the battery is maintained.

The covering material according to the first embodiment may be, for example, one or more oxides selected from the group consisting of $MnO_2$, $Al_2O_3$, MgO, $ZrO_2$, ZnO, $TiO_2$, $H_3BO_3$, $Mn_2O_3$, $Fe_2O_3$, CuO, NiO, $Co_3O_4$, $Eu_2O_3$, $Sm_2O_3$, $CeO_2$, and $SiO_2$.

This configuration can provide batteries having better cycle characteristics.

The covering material according to the first embodiment may be one or more oxides selected from the group consisting of $Al_2O_3$, $ZrO_2$, ZnO, $TiO_2$, and $SiO_2$.

This configuration can provide batteries having better cycle characteristics.

The covering material according to the first embodiment may be a transition metal oxide.

This configuration can provide batteries having better cycle characteristics.

The covering material according to the first embodiment may contain the same metal element as that contained in the above-described lithium composite oxide.

In this configuration, the metal elements firmly bond to each other through, for example, formation of a solid solution at an interface between the lithium composite oxide and the covering material. Therefore, the elution (e.g., elimination) of the metal element is suppressed. This can provide batteries having better cycle characteristics.

The covering material according to the first embodiment may be one or more materials selected from the group consisting of graphite, carbon black, and graphite fluoride. Examples of the carbon black include acetylene black, Ketjenblack (registered trademark), channel black, furnace black, lamp black, and thermal black.

This configuration can provide batteries having better cycle characteristics.

The covering material may be an insulating compound. The covering material does not necessarily contribute to an electrochemical reaction.

In the lithium composite oxide according to the first embodiment, the "cation elements such as transition metals" other than lithium are, for example, one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

In the lithium composite oxide according to the first embodiment, the "cation elements such as transition metals" may be, for example, one or more elements selected from the group consisting of Mn, Co, Ni, Fe, Cu, V, Nb, Ti, Cr, Ru, W, B, Si, P, and Al.

This configuration can provide batteries having higher capacity.

In the lithium composite oxide according to the first embodiment, the "cation elements such as transition metals" may be, for example, at least one element selected from the group consisting of Mn, Co, Ni, Fe, Cu, V, Ti, Cr, and Zn, that is, may be at least one 3d transition metal element.

This configuration can provide batteries having higher capacity.

The lithium composite oxide according to the first embodiment may contain Mn.

In this configuration, when the lithium composite oxide contains Mn having orbitals easily hybridized with those of oxygen, the elimination of oxygen during charge is suppressed. The crystal structure is further stabilized in a crystal including the first phase and the second phase as described above. Therefore, it is believed that a larger amount of Li can be intercalated and deintercalated. This can provide batteries having higher capacity.

The lithium composite oxide according to the first embodiment may contain one or more elements selected from the group consisting of F, Cl, N, and S.

In this configuration, the crystal structure is believed to be stabilized by partly replacing oxygen with an electrochemically inactive anion. It is also believed that crystal lattice expansion is caused by partly replacing oxygen with an anion having a large ionic radius, which improves the Li diffusibility. The crystal structure is further stabilized in a crystal including the first phase and the second phase as described above. Therefore, it is believed that a larger amount of Li can be intercalated and deintercalated. This can provide batteries having higher capacity.

The lithium composite oxide according to the first embodiment may contain F.

In this configuration, the cation-anion interaction is increased by partly replacing oxygen with F, which has a high electronegativity, thereby improving the discharge capacity or operating voltage of the battery. Furthermore, by dissolving F, which has a high electronegativity, electrons are localized compared with in the case where F is not contained. This can suppress the elimination of oxygen during charge and thus the crystal structure is stabilized. The crystal structure is further stabilized in a crystal including the first phase and the second phase as described above. Therefore, it is believed that a larger amount of Li can be intercalated and deintercalated. By combining these effects, batteries having higher capacity can be provided.

Next, an example of the chemical composition of the lithium composite oxide according to the first embodiment will be described.

The average composition of the lithium composite oxide according to the first embodiment may be represented by composition formula (2) below.

$$Li_xMe_yO_\alpha Q_\beta \quad \text{formula (2)}$$

Herein, Me may represent one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Me may include at least one element selected from the group consisting of Mn, Co, Ni, Fe, Cu, V, Ti, Cr, and Zn, that is, may include at least one 3d transition metal element.

Q may represent one or more elements selected from the group consisting of F, Cl, N, and S.

Furthermore, the following conditions may be satisfied in the composition formula (2):

$1.05 \leq x \leq 1.4$, $0.6 \leq y \leq 0.95$, $1.2 \leq \alpha \leq 2$, and $0 \leq \beta \leq 0.8$.

This configuration can provide batteries having higher capacity.

In the first embodiment, when Me is constituted by two or more elements (e.g., Me' and Me") and the composition ratio is "Me'$_{y1}$Me"$_{y2}$", "y=y1+y2" is given. For example, when Me is constituted by two elements (Mn and Co) and the composition ratio is "Mn$_{0.6}$Co$_{0.2}$", "y=0.6+0.2=0.8" is given. In the case where Q is constituted by two or more elements, the calculation can be conducted in the same manner as in the case of Me.

When x is 1.05 or more in the composition formula (2), the amount of Li that can be used is increased. This increases the capacity.

When x is 1.4 or less in the composition formula (2), the oxidation-reduction reaction of Me can be more utilized. As a result, the oxidation-reduction reaction of oxygen is less utilized. Thus, the crystal structure is stabilized. This increases the capacity.

When y is 0.6 or more in the composition formula (2), the oxidation-reduction reaction of Me can be more utilized. As a result, the oxidation-reduction reaction of oxygen is less utilized. Thus, the crystal structure is stabilized. This increases the capacity.

When y is 0.95 or less in the composition formula (2), the amount of Li that can be used is increased. This increases the capacity.

When α is 1.2 or more in the composition formula (2), the amount of charge compensation due to the oxidation-reduction reaction of oxygen can be prevented from decreasing. This increases the capacity.

When α is 2 or less in the composition formula (2), an excess increase in the capacity due to the oxidation-reduction reaction of oxygen can be prevented, which stabilizes a structure when Li is deintercalated. This increases the capacity.

When β is 0.8 or less in the composition formula (2), the influence of Q that is electrochemically inactive can be prevented from increasing, which improves the electron conductivity. This increases the capacity.

The term "average composition" of the lithium composite oxide according to the first embodiment refers to a composition obtained by performing ultimate analysis on the lithium composite oxide without considering the difference in composition of each phase. The average composition typically refers to a composition obtained by performing ultimate analysis using a sample having a size equal to or larger than the size of primary particles of the lithium composite oxide. The first phase and the second phase may have the same chemical composition. Alternatively, the first phase and the second phase do not necessarily have the same chemical composition.

The average composition can be determined by ICP emission spectrometry, an inert gas fusion-infrared absorption method, ion chromatography, or a combination thereof.

In the composition formula (2), Me may include one or more elements selected from the group consisting of Mn, Co, Ni, Fe, Cu, V, Nb, Ti, Cr, Ru, W, B, Si, P, and Al.

This configuration can provide batteries having higher capacity.

In the composition formula (2), Me may include Mn.

That is, Me may represent Mn.

Alternatively, Me may include Mn and one or more elements selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

In this configuration, when Me includes Mn having orbitals easily hybridized with those of oxygen, the elimination of oxygen during charge is suppressed. The crystal structure is further stabilized in a crystal including the first phase and the second phase as described above. This can provide batteries having higher capacity.

In the composition formula (2), the Mn content in Me may be 50 mol % or more. That is, the molar ratio (Mn/Me ratio) of Mn to Me including Mn may be 0.5 to 1.0.

In this configuration, when Me sufficiently includes Mn having orbitals easily hybridized with oxygen, the elimination of oxygen during charge is further suppressed. The crystal structure is further stabilized in a crystal including the first phase and the second phase as described above. This can provide batteries having higher capacity.

In the composition formula (2), the Mn content in Me may be 67.5 mol % or more. That is, the molar ratio (Mn/Me ratio) of Mn to Me including Mn may be 0.675 to 1.0.

In this configuration, when Me includes Mn having orbitals easily hybridized with those of oxygen in a larger amount, the elimination of oxygen during charge is further suppressed. The crystal structure is further stabilized in a crystal including the first phase and the second phase as described above. This can provide batteries having higher capacity.

In the composition formula (2), Me may include 20 mol % or less of one or more elements selected from the group consisting of B, Si, P, and Al relative to Me.

In this configuration, the structure is stabilized by adding an element that readily forms covalent bonds, which improves the cycle characteristics. This can provide batteries having a longer life.

Furthermore, the following conditions may be satisfied in the composition formula (2):

$1.1 \leq x \leq 1.25$, and $0.75 \leq y \leq 0.8$.

This configuration can provide batteries having higher capacity.

The following conditions may be satisfied in the composition formula (2):

$1.33 \leq \alpha \leq 1.9$, and $0.1 \leq \beta \leq 0.67$.

This configuration can provide batteries having higher capacity.

That is, the lithium composite oxide represented by the composition formula (2) may include Q (i.e., one or more elements selected from the group consisting of F, Cl, N, and S).

In this configuration, the crystal structure is believed to be stabilized by partly replacing oxygen with an electrochemically inactive anion. It is also believed that crystal lattice expansion is caused by partly replacing oxygen with an anion having a large ionic radius, which improves the diffusibility of Li. The crystal structure is further stabilized in a crystal including the first phase and the second phase as described above. This can provide batteries having higher capacity.

In the lithium composite oxide represented by the composition formula (2), Q may include F.

That is, Q may represent F.

Alternatively, Q may include F and one or more elements selected from the group consisting of Cl, N, and S.

In this configuration, the cation-anion interaction is increased by partly replacing oxygen with F, which has a high electronegativity, thereby improving the discharge capacity or operating voltage of the battery. Furthermore, by dissolving F, which has a high electronegativity, electrons are localized compared with in the case where F is not contained. This can suppress the elimination of oxygen during charge and thus the crystal structure is stabilized. The crystal structure is further stabilized in a crystal including the first phase and the second phase as described above. By combining these effects, batteries having higher capacity can be provided.

The following conditions may be satisfied in the composition formula (2):

$1.33 \leq \alpha \leq 1.67$, and $0.33 \leq \beta \leq 0.67$.

In this configuration, an excess increase in the capacity due to the oxidation-reduction reaction of oxygen can be prevented and the influence of Q that is electrochemically inactive is sufficiently large, which stabilizes a structure when Li is deintercalated. This can provide batteries having higher capacity.

In the composition formula (2), the ratio of "Li" and "Me" is represented by x/y.

The composition formula (2) may satisfy $1.3 \leq x/y \leq 1.9$.

This configuration can provide batteries having higher capacity.

When x/y is more than 1, the ratio of the number of Li atoms at sites at which Li atoms are located is larger than that of a known positive electrode active material represented by, for example, composition formula $LiMnO_2$. This allows a larger amount of Li to be intercalated and deintercalated.

When x/y is 1.3 or more, a large amount of Li can be used and thus the diffusion paths of Li can be appropriately formed. This can provide batteries having higher capacity.

When x/y is 1.9 or less, less utilization of the oxidation-reduction reaction of Me can be prevented. As a result, the oxidation-reduction reaction of oxygen is less utilized. Furthermore, the crystal structure can be prevented from being destabilized when Li is deintercalated during charge, and the efficiency of intercalating Li during discharge can be prevented from decreasing. This can provide batteries having higher capacity.

The composition formula (2) may satisfy $1.38 \leq x/y \leq 1.67$.

This configuration can provide batteries having higher capacity.

The composition formula (2) may satisfy $1.38 \leq x/y \leq 1.5$.

This configuration can provide batteries having higher capacity.

In the composition formula (2), the ratio of "O" and "Q" is represented by $\alpha/\beta$.

The composition formula (2) may satisfy $2 \leq \alpha/\beta \leq 19$.

This configuration can provide batteries having higher capacity.

When $\alpha/\beta$ is 2 or more, the amount of charge compensation due to the oxidation-reduction reaction of oxygen can be prevented from decreasing. Furthermore, the influence of Q that is electrochemically inactive can be reduced and thus the electron conductivity is improved. This can provide batteries having higher capacity.

When $\alpha/\beta$ is 19 or less, an excess increase in the capacity due to the oxidation-reduction reaction of oxygen can be prevented, which stabilizes a structure when Li is deintercalated. Furthermore, the influence of Q that is electrochemically inactive stabilizes a structure when Li is deintercalated. This can provide batteries having higher capacity.

The composition formula (2) may satisfy $2 \leq \alpha/\beta \leq 5$.

This configuration can provide batteries having higher capacity.

In the composition formula (2), the ratio of "Li+Me" and "O+Q" (i.e., the ratio of "cation" and "anion") is represented by $(x+y)/(\alpha+\beta)$.

The composition formula (2) may satisfy $0.75 \leq (x+y)/(\alpha+\beta) \leq 1.2$.

This configuration can provide batteries having higher capacity.

When $(x+y)/(\alpha+\beta)$ is 0.75 or more, the generation of a large amount of impurities due to phase separation during synthesis can be prevented. This can provide batteries having higher capacity.

When $(x+y)/(\alpha+\beta)$ is 1.2 or less, a structure with a small amount of anion deficiency is formed, and thus the crystal structure is stabilized when Li is deintercalated during charge. This can provide batteries having higher capacity.

The compound represented by the composition formula (2) may satisfy $0.95 \leq (x+y)/(\alpha+\beta) \leq 1.0$.

This configuration can provide batteries having higher capacity and better cycle characteristics.

When $(x+y)/(\alpha+\beta)$ is 1.0 or less, a cation-deficient structure is formed, and thus a larger number of Li diffusion paths are formed. This can provide batteries having higher capacity. Furthermore, cation deficits are randomly arranged in an initial state, and thus the structure is not destabilized when Li is deintercalated. This can provide batteries having good cycle characteristics and a long life.

In the lithium composite oxide according to the first embodiment, Li may be partly replaced with an alkali metal such as Na or K.

The positive electrode active material according to the first embodiment may contain the above-described lithium composite oxide as a main component (i.e., 50% or more relative to the entire positive electrode active material on a mass basis (50 mass % or more)).

This configuration can provide batteries having higher capacity.

The positive electrode active material according to the first embodiment may contain 70% or more (70 mass % or more) of the lithium composite oxide relative to the entire positive electrode active material on a mass basis.

This configuration can provide batteries having higher capacity.

The positive electrode active material according to the first embodiment may contain 90% or more (90 mass % or more) of the lithium composite oxide relative to the entire positive electrode active material on a mass basis.

This configuration can provide batteries having higher capacity.

The positive electrode active material according to the first embodiment may further contain unavoidable impurities in addition to the above-described lithium composite oxide and covering material.

The positive electrode active material according to the first embodiment may further contain, in addition to the above-described lithium composite oxide and covering material, at least one selected from the group consisting of a starting material used when the positive electrode active material is synthesized, a by-product, and a decomposition product.

The positive electrode active material according to the first embodiment may contain only the above-described lithium composite oxide and covering material except for, for example, unavoidable impurities.

This configuration can provide batteries having higher capacity and better cycle characteristics.

Method for Producing Positive Electrode Active Material

Hereafter, an example of a method for producing a lithium composite oxide contained in the positive electrode active material according to the first embodiment will be described.

The lithium composite oxide according to the first embodiment can be produced by, for example, the following method.

A raw material containing Li, a raw material containing Me, and a raw material containing Q are provided.

Examples of the raw material containing Li include oxides such as $Li_2O$ and $Li_2O_2$; salts such as LiF, $Li_2CO_3$, and LiOH; and lithium composite oxides such as $LiMeO_2$ and $LiMe_2O_4$.

Examples of the raw material containing Me include oxides such as $Me_2O_3$, salts such as $MeCO_3$ and $MeNO_3$, hydroxides such as $Me(OH)_2$ and MeOOH, and lithium composite oxides such as $LiMeO_2$ and $LiMe_2O_4$.

For example, when Me represents Mn, examples of the raw material containing Mn include manganese oxides such as $MnO_2$ and $Mn_2O_3$, salts such as $MnCO_3$ and $MnNO_3$, hydroxides such as $Mn(OH)_2$ and MnOOH, and lithium composite oxides such as $LiMnO_2$ and $LiMn_2O_4$.

Examples of the raw material containing Q include lithium halides, transition metal halides, transition metal sulfides, and transition metal nitrides.

For example, when Q represents F, examples of the raw material containing F include LiF and transition metal fluorides.

These raw materials are weighed so as to have, for example, the molar ratio in the composition formula (2).

Thus, "x, y, α, and β" in the composition formula (2) can be changed within the range in the composition formula (2).

The weighed raw materials are mixed with each other by, for example, a dry process or a wet process and mechanochemically reacted for 10 hours or more to obtain a compound (precursor). For example, a mixer such as a planetary ball mill can be used.

Then, the obtained compound is heat-treated. Thus, a lithium composite oxide according to the first embodiment is obtained.

The heat treatment conditions are appropriately set so that the lithium composite oxide according to the first embodiment is obtained. Although the optimum heat treatment conditions vary depending on other production conditions and the target composition, the present inventors have found that the ratio $I_{(18°-20°)}/I_{(43°-46°)}$ tends to increase as the heat treatment temperature increases or as the heat treatment time increases. Therefore, manufacturers can determine the heat treatment conditions on the basis of this tendency. The heat treatment temperature may be selected from, for example, the range of 300° C. to 500° C. and the heat treatment time may be selected from, for example, the range of 30 minutes to 2 hours. The atmosphere during the heat treatment may be an air atmosphere, an oxygen atmosphere, or an inert atmosphere such as a nitrogen or argon atmosphere.

By controlling the raw materials used, the mixing conditions of the raw material mixture, and the heat treatment conditions as described above, the lithium composite oxide according to the first embodiment can be substantially obtained.

The space group of the crystal structure of the obtained lithium composite oxide can be identified by, for example, X-ray diffraction measurement or electron diffraction measurement. This confirms that the obtained lithium composite oxide includes a first phase having a crystal structure that belongs to a space group Fm-3m and a second phase having a crystal structure that belongs to a space group (e.g., Fd-3m, R-3m, or C2/m) other than a space group Fm-3m.

The average composition of the obtained lithium composite oxide can be determined by, for example, ICP emission spectrometry, an inert gas fusion-infrared absorption method, ion chromatography, or a combination thereof.

The energy required for mixing the elements can be further decreased by using, for example, a lithium-transition metal composite oxide as a precursor. This provides a lithium composite oxide with a higher purity according to the first embodiment.

As described above, the method for producing a lithium composite oxide according to the first embodiment includes (a) a step of providing raw materials, (b) a step of mechanochemically reacting the raw materials to obtain a precursor of a lithium composite oxide, and (c) a step of heat-treating the precursor to obtain a lithium composite oxide.

The step (a) may include a step of preparing a raw material mixture by mixing the raw materials such that the molar ratio of Li to Me is 1.3 or more and 1.9 or less.

Herein, the step (a) may include a step of producing a lithium compound serving as a raw material by a publicly known method.

The step (a) may include a step of preparing a raw material mixture by mixing the raw materials such that the molar ratio of Li to Me is 1.38 or more and 1.67 or less.

The step (b) may include a step of mechanochemically reacting the raw materials using a ball mill.

As described above, the lithium composite oxide according to the first embodiment can be synthesized by mechanochemically reacting the raw materials (e.g., LiF, $Li_2O$, transition metal oxide, and lithium-transition metal composite oxide) using a planetary ball mill and then performing firing in the air.

Hereafter, an example of a method for treating a covering material contained in the positive electrode active material according to the first embodiment will be described.

Any treatment method for further adding the covering material according to the first embodiment to the obtained lithium composite oxide may be employed. Examples of the treatment method that may be employed include an atomic layer deposition method, a neutralization reaction, a silane coupling reaction, a sol-gel process, and use of a planetary ball mill.

The covering material according to the first embodiment is, for example, a metal oxide. The metal oxide may be treated by, for example, a neutralization reaction. For example, an acidic salt of metal oxide may be added to an alkaline aqueous solution containing the lithium composite oxide dissolved therein. This causes a neutralization reaction and thus a metal oxide coating film can be formed on the surface of the lithium composite oxide. Examples of the acidic salt of metal oxide include manganese nitrate, magnesium nitrate, aluminum sulfate, calcium nitrate, sodium nitrate, potassium nitrate, and titanium sulfate.

The method for treating a covering material may be, for example, an atomic layer deposition method. Thus, a coating film of the covering material can be formed on the surface of the lithium composite oxide. Examples of the covering material include alumina, titanium oxide, zirconium oxide, zinc oxide, and tantalum oxide.

The presence of the lithium composite oxide and covering material contained in the positive electrode active material according to the first embodiment (e.g., covering of the surface of the lithium composite oxide with the covering material) can be observed by, for example, X-ray photoelectron spectroscopy or use of a scanning electron microscope or a transmission electron microscope.

Second Embodiment

Hereafter, a second embodiment will be described. Note that the same description as in the first embodiment will be appropriately omitted to avoid redundancy.

A battery according to the second embodiment includes a positive electrode containing the positive electrode active material according to the first embodiment, a negative electrode, and an electrolyte.

This configuration can provide batteries having good cycle characteristics.

In the battery according to the second embodiment, the positive electrode may include a positive electrode active material layer. Herein, the positive electrode active material layer may contain the positive electrode active material according to the first embodiment as a main component (i.e., 50% or more relative to the entire positive electrode active material layer on a mass basis (50 mass % or more)).

This configuration can provide batteries having better cycle characteristics.

Alternatively, in the battery according to the second embodiment, the positive electrode active material layer may contain 70% or more (70 mass % or more) of the positive electrode active material according to the first embodiment relative to the entire positive electrode active material layer on a mass basis.

This configuration can provide batteries having better cycle characteristics.

Alternatively, in the battery according to the second embodiment, the positive electrode active material layer may contain 90% or more (90 mass % or more) of the positive electrode active material according to the first embodiment relative to the entire positive electrode active material layer on a mass basis.

This configuration can provide batteries having better cycle characteristics.

The battery according to the second embodiment can be used for, for example, lithium ion secondary batteries, nonaqueous electrolyte secondary batteries, and all-solid-state batteries.

That is, the negative electrode of the battery according to the second embodiment may contain, for example, a negative electrode active material capable of occluding and releasing lithium ions. Alternatively, the negative electrode may contain, for example, a material capable of dissolving and precipitating lithium metal as a negative electrode active material.

In the battery according to the second embodiment, the electrolyte may be, for example, a nonaqueous electrolyte (e.g., nonaqueous electrolytic solution).

In the battery according to the second embodiment, the electrolyte may be, for example, a solid electrolyte.

FIG. 1 is a sectional view illustrating a schematic structure of a battery 10 that is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., nonaqueous electrolytic solution).

The positive electrode 21, the negative electrode 22, and the separator 14 constitute an electrode assembly.

The electrode assembly is accommodated in the case 11.

The case 11 is sealed using the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or aluminum alloy).

The positive electrode current collector 12 may be omitted, and the case 11 may be used as a positive electrode current collector.

The positive electrode active material layer 13 contains the positive electrode active material according to the first embodiment.

The positive electrode active material layer 13 may optionally contain, for example, additives (e.g., a conductive agent, an ion conductive auxiliary agent, and a binding agent).

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, or aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may optionally contain, for example, additives (a conductive agent, an ion conductive auxiliary agent, and a binding agent).

Examples of the negative electrode active material include metal materials, carbon materials, oxides, nitrides, tin compounds, and silicon compounds.

The metal material may be a single metal or an alloy. Examples of the metal material include lithium metal and lithium alloys.

Examples of the carbon material include natural graphite, coke, partially graphitized carbon, carbon fiber, spherical carbon, artificial graphite, and amorphous carbon.

From the viewpoint of capacity density, the negative electrode active material may be silicon (Si), tin (Sn), a silicon compound, or a tin compound. The silicon compound and the tin compound may each be an alloy or a solid solution.

An example of the silicon compound is $SiO_x$ ($0.05<x<1.95$). A compound (alloy or solid solution) obtained by partly replacing a silicon atom of $SiO_x$ with another element may also be used. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ ($0<x<2$), $SnO_2$, and $SnSiO_3$. One tin compound selected from the foregoing may be used alone. Alternatively, two or more tin compounds selected from the foregoing may be used in combination.

The negative electrode active material may have any form. A negative electrode active material having a publicly known form (e.g., particulate form or fibrous form) can be used.

Lithium may be supplied (occluded) to the negative electrode active material layer 17 by any method. Specifically, the method is a method (a) in which lithium is deposited onto the negative electrode active material layer 17 by a gas phase method such as a vacuum deposition method or a method (b) in which a lithium metal foil and the negative electrode active material layer 17 are heated while being in contact with each other. By any of the methods, lithium can be diffused into the negative electrode active material layer 17 using heat. Alternatively, lithium may be electrochemically occluded into the negative electrode active material layer 17. Specifically, a battery is assembled using a negative electrode 22 not containing lithium and a lithium metal foil (positive electrode). Then, the battery is charged so that lithium is occluded into the negative electrode 22.

Examples of the binding agent for the positive electrode 21 and the negative electrode 22 include polyvinylidene fluoride, polytetrafluoroethylene, polyethylene, polypropylene, aramid resin, polyimide, polyimide, polyimide-imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyether, polyether sulfone, hexafluoropolypropylene, styrene-butadiene rubber, and carboxymethyl cellulose. Alternatively, the binding agent may be a copolymer of two or more materials selected from the group consisting of tetrafluoroethylene, hexafluoroethane, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binding agent may be a mixture of two or more materials selected from the foregoing materials.

Examples of the conductive agent for the positive electrode 21 and the negative electrode 22 include graphite, carbon black, conductive fibers, graphite fluoride, metal powder, conductive whiskers, conductive metal oxides, and organic conductive materials. Examples of the graphite include natural graphite and artificial graphite. Examples of the carbon black include acetylene black, Ketjenblack (registered trademark), channel black, furnace black, lamp black, and thermal black. An example of the metal powder is an aluminum powder. Examples of the conductive whiskers include zinc oxide whiskers and potassium titanate whiskers. An example of the conductive metal oxides is titanium oxide. An example of the organic conductive materials is a phenylene derivative.

The surface of the binding agent may be covered with a material used as the conductive agent. For example, the surface of the binding agent may be covered with carbon black. This increases the capacity of the battery.

The separator 14 may be made of a material having high ion permeability and sufficient mechanical strength. Examples of the material include microporous thin films, woven fabric, and nonwoven fabric. Specifically, the separator 14 is desirably made of a polyolefin such as polypropylene or polyethylene. The separator 14 made of a polyolefin has not only high durability, but also a shutdown function exhibited when excessively heated. The separator 14 has a thickness of, for example, 10 to 300 μm (or 10 to 40 μm). The separator 14 may be a single-layer film made of one material. Alternatively, the separator 14 may be a composite film (multilayer film) made of two or more materials. The separator 14 has a porosity of, for example, 30% to 70% (or 35% to 60%). The term "porosity" refers to a proportion of the volume of pores to the total volume of the separator 14. The "porosity" is measured by, for example, mercury intrusion.

The nonaqueous electrolytic solution contains a nonaqueous solvent and a lithium salt dissolved in the nonaqueous solvent.

Examples of the nonaqueous solvent include cyclic carbonate solvents, linear carbonate solvents, cyclic ether solvents, linear ether solvents, cyclic ester solvents, linear ester solvents, and fluorinated solvents.

Examples of the cyclic carbonate solvents include ethylene carbonate, propylene carbonate, and butylene carbonate.

Examples of the linear carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the linear ether solvents include 1,2-dimethoxyethane and 1,2-diethoxyethane.

An example of the cyclic ester solvents is γ-butyrolactone.

An example of the linear ester solvents is methyl acetate.

Examples of the fluorinated solvents include fluoroethylene carbonate, methyl fluoropropionate, fluorobenzene, fluoroethyl methyl carbonate, and fluorodimethylene carbonate.

One nonaqueous solvent selected from the foregoing solvents may be used alone. Alternatively, two or more nonaqueous solvents selected from the foregoing solvents may be used in combination.

The nonaqueous electrolytic solution may contain at least one fluorinated solvent selected from the group consisting of fluoroethylene carbonate, methyl fluoropropionate, fluorobenzene, fluoroethyl methyl carbonate, and fluorodimethylene carbonate.

When these fluorinated solvents are contained in the nonaqueous electrolytic solution, the oxidation resistance of the nonaqueous electrolytic solution is improved.

As a result, even when the battery 10 is charged at high voltage, the battery 10 can be stably operated.

In the battery according to the second embodiment, the electrolyte may be a solid electrolyte.

Examples of the solid electrolyte include organic polymer solid electrolytes, oxide solid electrolytes, and sulfide solid electrolytes.

An example of the organic polymer solid electrolytes is a compound of a polymer compound and a lithium salt.

The polymer compound may have an ethylene oxide structure. In this case, a large amount of the lithium salt can be contained, which further improves the ionic conductivity.

Examples of the oxide solid electrolytes include NASICON solid electrolytes such as $LiTi_2(PO_4)_3$ and its element-substituted derivatives; (LaLi)TiO$_3$-based perovskite solid electrolytes; LISICON solid electrolytes such as Li$_{14}$ZnGe$_4$O$_{16}$, Li$_4$SiO$_4$, LiGeO$_4$, and their element-substituted derivatives; garnet solid electrolytes such as Li$_7$La$_3$Zr$_2$O$_{12}$ and its element-substituted derivatives; Li$_3$N and its H-substituted derivatives; and Li$_3$PO$_4$ and its N-substituted derivatives.

Examples of the sulfide solid electrolytes include Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, and Li$_{10}$GeP$_2$S$_{12}$. Furthermore, LiX (X: F, Cl, Br, or I), MO$_y$, Li$_x$MO$_y$ (M: P, Si, Ge, B, Al, Ga, or In) (x and y: natural number), or the like may be added to the foregoing sulfide solid electrolytes.

In particular, among these solid electrolytes, sulfide solid electrolytes have excellent formability and high ionic conductivity. Therefore, the use of the sulfide solid electrolytes can provide batteries having a higher energy density.

Among the sulfide solid electrolytes, Li$_2$S—P$_2$S$_5$ has high electrochemical stability and higher ionic conductivity. Therefore, the use of Li$_2$S—P$_2$S$_5$ as a solid electrolyte can provide batteries having a higher energy density.

A solid electrolyte layer may contain the above-described nonaqueous electrolytic solution.

When a solid electrolyte layer contains the nonaqueous electrolytic solution, lithium ion transfer is facilitated between the active material and the solid electrolyte. This can provide batteries having a higher energy density.

The solid electrolyte layer may contain, for example, a gel electrolyte and an ionic liquid in addition to the solid electrolyte.

The gel electrolyte may be a polymer material containing a nonaqueous electrolytic solution. Examples of the polymer material include polyethylene oxide, polyacrylonitrile, polyvinylidene fluoride, poly(methyl methacrylate), and polymers having an ethylene oxide bond.

Examples of cations for the ionic liquid include chain aliphatic quaternary salts such as tetraalkylammoniums and tetraalkylphosphoniums; alicyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of anions for the ionic liquid include PF$_6^-$, BF$_4^-$, SbF$_6^-$, AsF$_6^-$, SO$_3$CF$_3^-$, N(SO$_2$CF$_3$)2$^-$, N(SO$_2$C$_2$F$_5$)$_2^-$, N(SO$_2$CF$_3$)(SO$_2$C$_4$F$_9$)$^-$, and C(SO$_2$CF$_3$)$_3^-$. The ionic liquid may contain a lithium salt.

Examples of the lithium salt include LiPF$_6$, LiBF$_4$, LiSbF$_6$, LiAsF$_6$, LiSO$_3$CF$_3$, LiN(SO$_2$CF$_3$)$_2$, LiN(SO$_2$C$_2$F$_5$)$_2$, LiN(SO$_2$CF$_3$)(SO$_2$C$_4$F$_9$), and LiC(SO$_2$CF$_3$)$_3$. One lithium salt selected from the foregoing lithium salts may be used alone. Alternatively, two or more lithium salts selected from the foregoing lithium salts may be used as a mixture. The concentration of the lithium salt is, for example, in the range of 0.5 to 2 mol/L.

The battery according to the second embodiment may have various forms. For example, coin batteries, cylinder batteries, prismatic batteries, sheet batteries, button batteries, flat batteries, and stack batteries may be employed.

EXAMPLES

Example 1

Production of Positive Electrode Active Material

LiF, Li$_2$MnO$_3$, and LiMnO$_2$ were weighed so as to have a molar ratio of Li/Mn/O/F=1.2/0.8/1.33/0.67.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor of a lithium composite oxide.

The obtained precursor was subjected to powder X-ray diffraction measurement.

The space group of the obtained precursor was Fm-3m.

The obtained precursor was then heat-treated in an air atmosphere at 500° C. for 2 hours to obtain a lithium composite oxide.

The obtained lithium composite oxide was subjected to powder X-ray diffraction measurement.

Figure 2:
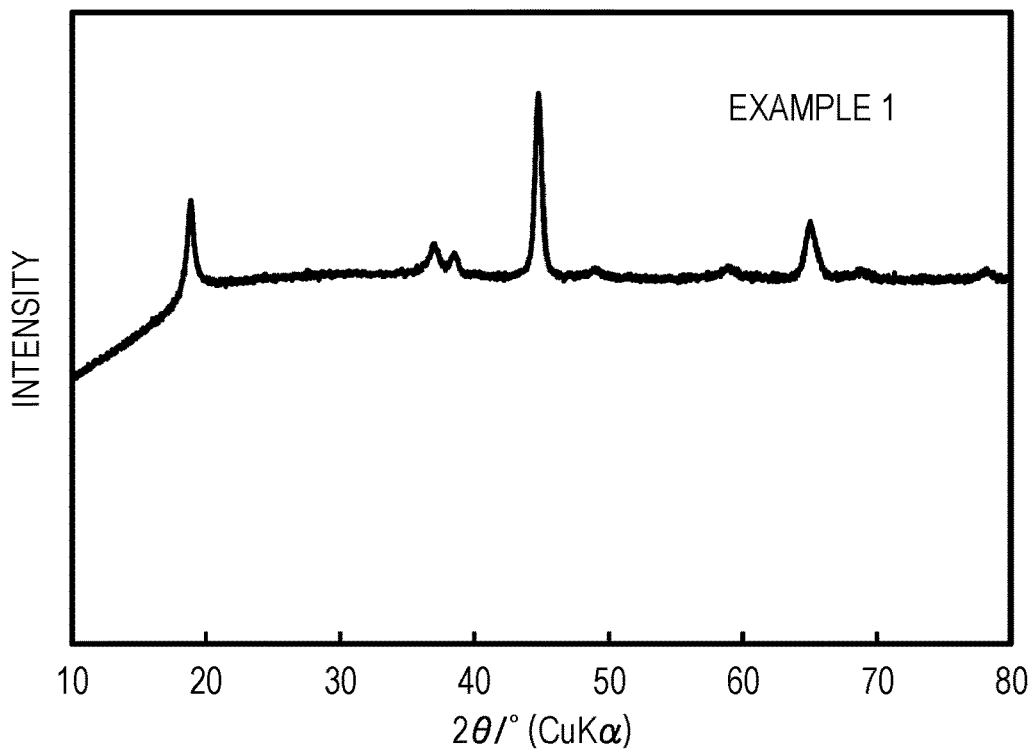
FIG. 2 illustrates an XRD pattern of a lithium composite oxide in Example 1.

FIG. 2 illustrates the measurement results.

Furthermore, the obtained lithium composite oxide was subjected to powder X-ray diffraction measurement and electron diffraction measurement to analyze the crystal structure.

The obtained lithium composite oxide was a two-phase mixture including a phase that belongs to a space group Fm-3m and a phase that belongs to Fd-3m.

The ratio $I_{(18°-20°)}/I_{(43°-46°)}$ of the obtained lithium composite oxide was 0.54.

The obtained lithium composite oxide was then surface-treated by an atomic layer deposition method. Specifically, trimethylaluminum and ozone were alternately stacked in a vacuum atmosphere at 150° C. to form an alumina (Al$_2$O$_3$) coating film on the surface of the lithium composite oxide.

As a result of the observation of the obtained positive electrode active material through X-ray photoelectron spectroscopy, it was confirmed that Al$_2$O$_3$ was present on the surface of the lithium composite oxide having an average composition represented by Li$_{1.2}$Mn$_{0.8}$O$_{1.33}$F$_{0.67}$.

The Al$_2$O$_3$ coating film had a thickness of 0.5 nm.

Production of Battery

Subsequently, 70 parts by mass of the positive electrode active material, 20 parts by mass of a conductive agent, 10 parts by mass of polyvinylidene fluoride (PVDF), and an appropriate amount of 2-methylpyrrolidone (NMP) were mixed with each other. Thus, a positive electrode mixture slurry was prepared.

The positive electrode mixture slurry was applied onto one surface of a positive electrode current collector having a thickness of 20 μm and formed of an aluminum foil.

The positive electrode mixture slurry was dried and rolling was performed to obtain a positive electrode plate including a positive electrode active material layer and having a thickness of 60 μm.

The obtained positive electrode plate was stamped into a circular shape with a diameter of 12.5 mm to obtain a positive electrode.

Furthermore, a lithium metal foil having a thickness of 300 μm was stamped into a circular shape with a diameter of 14.0 mm to obtain a negative electrode.

Fluoroethylene carbonate (FEC), ethylene carbonate (EC), and ethyl methyl carbonate (EMC) were mixed at a volume ratio of 1:1:6 to obtain a nonaqueous solvent.

LiPF$_6$ was dissolved in the nonaqueous solvent in a concentration of 1.0 mol/L to obtain a nonaqueous electrolytic solution.

A separator (manufactured by Celgard, LLC., product number: 2320, thickness: 25 μm) was impregnated with the obtained nonaqueous electrolytic solution. The separator is a three-layer separator including a polypropylene layer, a polyethylene layer, and a polypropylene layer.

The positive electrode, the negative electrode, and the separator were assembled in a dry box in which the dew point was controlled to −50° C., and thus a CR2032 coin battery was produced.

Example 2

The thickness of the $Al_2O_3$ coating film was changed from that in Example 1.

Table 1 shows the thickness of the $Al_2O_3$ coating film in Example 2. The thickness of the $Al_2O_3$ coating film was 1.0 nm in Example 2.

Except for this, a positive electrode active material in Example 2 was synthesized in the same manner as in Example 1.

Furthermore, a coin battery in Example 2 was produced in the same manner as in Example 1 using the positive electrode active material in Example 2.

Examples 3 to 6

The covering material added was changed from that in Example 1.

Table 1 shows the composition of each of covering materials used in Examples 3 to 6. ZnO was used in Example 3, $ZrO_2$ was used in Example 4, $TiO_2$ was used in Example 5, and $SiO_2$ was used in Example 6.

Except for this, positive electrode active materials in Examples 3 to 6 were synthesized in the same manner as in Example 1.

Furthermore, coin batteries in Examples 3 to 6 were produced in the same manner as in Example 1 using the positive electrode active materials in Examples 3 to 6.

Example 7

LiF, $Li_2MnO_3$, $LiMnO_2$, and $LiCoO_2$ were weighed so as to have a molar ratio of Li/Mn/Co/O/F=1.2/0.4/0.4/1.9/0.1.

The weighed raw materials were inserted into a 45 cc zirconia container together with an appropriate amount of ϕ3 mm zirconia balls, and the container was hermetically sealed in an argon glove box.

The raw materials were then taken out of the argon glove box and treated with a planetary ball mill at 600 rpm for 30 hours to obtain a precursor of a lithium composite oxide.

The obtained precursor was subjected to powder X-ray diffraction measurement.

The space group of the obtained precursor was Fm-3m.

The obtained precursor was then heat-treated in an air atmosphere at 300° C. for 30 minutes to obtain a lithium composite oxide.

The obtained lithium composite oxide was subjected to powder X-ray diffraction measurement and electron diffraction measurement to analyze the crystal structure.

The obtained lithium composite oxide was a two-phase mixture including a phase that belongs to a space group Fm-3m and a phase that belongs to a space group R-3m.

The ratio $I_{(18°-20°)}/I_{(43°-46°)}$ of the obtained lithium composite oxide was 0.22.

The obtained lithium composite oxide was then surface-treated by an atomic layer deposition method. Specifically, trimethylaluminum and ozone were alternately stacked in a vacuum atmosphere at 150° C. to form an alumina ($Al_2O_3$) coating film on the surface of the lithium composite oxide.

As a result of the observation of the obtained positive electrode active material through X-ray photoelectron spectroscopy, it was confirmed that $Al_2O_3$ was present on the surface of the lithium composite oxide having an average composition represented by $Li_{1.2}Mn_{0.4}Co_{0.4}O_{1.9}F_{0.1}$.

The $Al_2O_3$ coating film had a thickness of 0.5 nm.

A coin battery in Example 7 was produced in the same manner as in Example 1 using the positive electrode active material in Example 7.

Examples 8 to 12

The thickness of the $Al_2O_3$ coating film or the covering material added was changed from that in Example 7.

Table 1 shows the covering material added and the thickness of the coating film in Examples 8 to 12.

Except for this, positive electrode active materials in Examples 8 to 12 were synthesized in the same manner as in Example 7.

Furthermore, coin batteries in Examples 8 to 12 were produced in the same manner as in Example 1 using the positive electrode active materials in Examples 8 to 12.

Example 13

LiF, $Li_2MnO_3$, $LiMnO_2$, $LiCoO_2$, and $LiNiO_2$ were weighed so as to have a molar ratio of Li/Mn/Co/Ni/O/F=1.2/0.54/0.13/0.13/1.9/0.1.

The weighed raw materials were inserted into a 45 cc zirconia container together with an appropriate amount of ϕ3 mm zirconia balls, and the container was hermetically sealed in an argon glove box.

The raw materials were then taken out of the argon glove box and treated with a planetary ball mill at 600 rpm for 30 hours to obtain a precursor of a lithium composite oxide.

The obtained precursor was subjected to powder X-ray diffraction measurement.

The space group of the obtained precursor was Fm-3m.

The obtained precursor was then heat-treated in an air atmosphere at 500° C. for 30 minutes to obtain a lithium composite oxide.

The obtained lithium composite oxide was subjected to powder X-ray diffraction measurement and electron diffraction measurement to analyze the crystal structure.

The obtained lithium composite oxide was a two-phase mixture including a phase that belongs to a space group Fm-3m and a phase that belongs to a space group C2/m.

The ratio $I_{(18°-20°)}/I_{(43°-46°)}$ of the obtained lithium composite oxide was 0.31.

The obtained lithium composite oxide was then surface-treated by an atomic layer deposition method. Specifically, trimethylaluminum and ozone were alternately stacked in a vacuum atmosphere at 150° C. to form an alumina ($Al_2O_3$) coating film on the surface of the lithium composite oxide.

As a result of the observation of the obtained positive electrode active material through X-ray photoelectron spectroscopy, it was confirmed that $Al_2O_3$ was present on the surface of the lithium composite oxide having an average composition represented by $Li_{1.2}Mn_{0.54}Co_{0.13}Ni_{0.3}O_{1.9}F_{0.1}$.

The $Al_2O_3$ coating film had a thickness of 0.5 nm.

A coin battery in Example 13 was produced in the same manner as in Example 1 using the positive electrode active material in Example 13.

Examples 14 to 18

The thickness of the $Al_2O_3$ coating film or the covering material added was changed from that in Example 13.

Table 1 shows the covering material added and the thickness of the coating film in Examples 14 to 18.

Except for this, positive electrode active materials in Examples 14 to 18 were synthesized in the same manner as in Example 13.

Coin batteries in Examples 14 to 18 were produced in the same manner as in Example 1 using the positive electrode active materials in Examples 14 to 18.

Comparative Examples 1 to 3

Lithium composite oxides in Comparative Examples 1 to 3 were obtained in the same manner as in Examples 1 to 18.

Table 1 shows the average composition of each of the lithium composite oxides in Comparative Examples 1 to 3.

Herein, the covering material was not added.

Except for this, positive electrode active materials in Comparative Examples 1 to 3 were synthesized in the same manner as in Examples 1 to 18.

Coin batteries in Comparative Examples 1 to 3 were produced in the same manner as in Example 1 using the obtained positive electrode active materials.

Evaluation of Battery

The current density at the positive electrode was set to 0.5 mA/cm$^2$ and the batteries in Examples 1 to 18 and Comparative Examples 1 to 3 were charged until the voltage reached 4.9 V.

Subsequently, the end-of-discharge voltage was set to 2.5 V and the batteries in Examples 1 to 18 and Comparative Examples 1 to 3 were discharged at a current density of 0.5 mA/cm$^2$.

Furthermore, 20 cycles of the charge-discharge test were repeatedly performed to measure the capacity retention of each of the batteries in Examples 1 to 18 and Comparative Examples 1 to 3.

Figure 3:
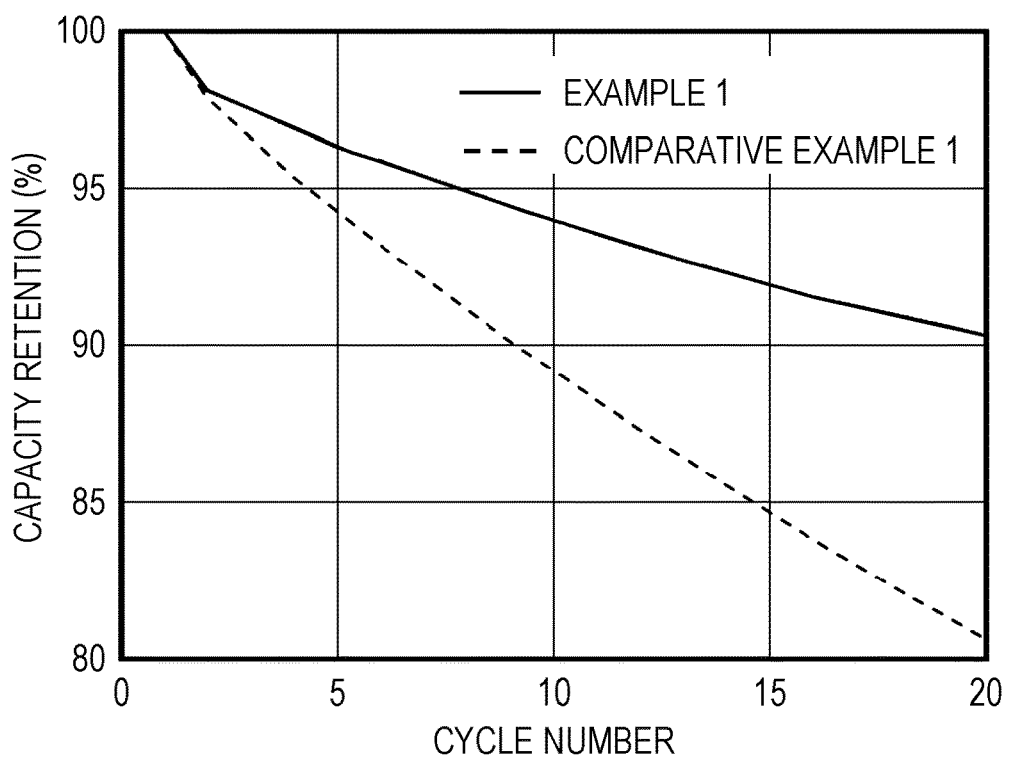
FIG. 3 illustrates the results of a charge-discharge cycle test of batteries in Example 1 and Comparative Example 1.

FIG. 3 illustrates the results of the charge-discharge cycle test of the batteries in Example 1 and Comparative Example 1.

The capacity retention after 20 cycles of the battery in Example 1 was 90%. On the other hand, the capacity retention after 20 cycles of the battery in Comparative Example 1 was 80%.

Table 1 shows the results.

As shown in Table 1, the batteries in Examples 1 to 6 have a higher capacity retention after 20 cycles than the battery in Comparative Example 1.

As shown in Table 1, the batteries in Examples 7 to 12 have a higher capacity retention after 20 cycles than the battery in Comparative Example 2.

As shown in Table 1, the batteries in Examples 13 to 18 have a higher capacity retention after 20 cycles than the battery in Comparative Example 3.

The reason for this is believed to be as follows. The batteries in Examples 1 to 18 contain a covering material. That is, the direct contact between the surface of the lithium composite oxide and the electrolytic solution is suppressed by the covering material. This suppresses, for example, the generation of gas due to a side reaction of the lithium composite oxide and the electrolytic solution, the elimination of oxygen, and the generation of a side reaction product onto the surface of the positive electrode active material. Thus, the capacity retention after 20 cycles is improved.

As shown in Table 1, the battery in Example 2 has a lower initial discharge capacity but a higher capacity retention after 20 cycles than the battery in Example 1.

As shown in Table 1, the battery in Example 8 has a lower initial discharge capacity but a higher capacity retention after 20 cycles than the battery in Example 7.

As shown in Table 1, the battery in Example 14 has a lower initial discharge capacity but a higher capacity retention after 20 cycles than the battery in Example 13.

The reason for this is believed to be as follows. Since the batteries in Example 2, Example 8, and Example 14 have a thick coating film of the covering material (i.e., the thickness is 1.0 nm), the surface of the lithium composite oxide becomes electrochemically inactive, which increases the resistance. This decreases the Li conductivity and thus decreases the initial discharge capacity.

On the other hand, since the batteries in Example 2, Example 8, and Example 14 have a thick coating film of the

TABLE 1

| | Lithium composite oxide | | | Covering material | | Initial discharge capacity (mAh/g) | Capacity retention (%) |
|---|---|---|---|---|---|---|---|
| | Average composition | Space group (other than Fm-3m) | $I_{(18°-20°)}/I_{(43°-46°)}$ | Composition | Thickness (nm) | | |
| Example 1 | $Li_{1.2}Mn_{0.8}O_{1.33}F_{0.67}$ | Fd-3m | 0.54 | $Al_2O_3$ | 0.5 | 309 | 90 |
| Example 2 | $Li_{1.2}Mn_{0.8}O_{1.33}F_{0.67}$ | Fd-3m | 0.56 | $Al_2O_3$ | 1.0 | 294 | 93 |
| Example 3 | $Li_{1.2}Mn_{0.8}O_{1.33}F_{0.67}$ | Fd-3m | 0.55 | ZnO | 0.5 | 306 | 92 |
| Example 4 | $Li_{1.2}Mn_{0.8}O_{1.33}F_{0.67}$ | Fd-3m | 0.53 | $ZrO_2$ | 0.5 | 303 | 86 |
| Example 5 | $Li_{1.2}Mn_{0.8}O_{1.33}F_{0.67}$ | Fd-3m | 0.53 | $TiO_2$ | 0.5 | 302 | 87 |
| Example 6 | $Li_{1.2}Mn_{0.8}O_{1.33}F_{0.67}$ | Fd-3m | 0.48 | $SiO_2$ | 0.5 | 301 | 87 |
| Example 7 | $Li_{1.2}Mn_{0.4}Co_{0.4}O_{1.9}F_{0.1}$ | R-3m | 0.22 | $Al_2O_3$ | 0.5 | 254 | 93 |
| Example 8 | $Li_{1.2}Mn_{0.4}Co_{0.4}O_{1.9}F_{0.1}$ | R-3m | 0.25 | $Al_2O_3$ | 1.0 | 246 | 95 |
| Example 9 | $Li_{1.2}Mn_{0.4}Co_{0.4}O_{1.9}F_{0.1}$ | R-3m | 0.24 | ZnO | 0.5 | 247 | 93 |
| Example 10 | $Li_{1.2}Mn_{0.4}Co_{0.4}O_{1.9}F_{0.1}$ | R-3m | 0.20 | $ZrO_2$ | 0.5 | 245 | 92 |
| Example 11 | $Li_{1.2}Mn_{0.4}Co_{0.4}O_{1.9}F_{0.1}$ | R-3m | 0.29 | $TiO_2$ | 0.5 | 250 | 95 |
| Example 12 | $Li_{1.2}Mn_{0.4}Co_{0.4}O_{1.9}F_{0.1}$ | R-3m | 0.24 | $SiO_2$ | 0.5 | 250 | 94 |
| Example 13 | $Li_{1.2}Mn_{0.54}Co_{0.13}Ni_{0.13}O_{1.9}F_{0.1}$ | C2/m | 0.31 | $Al_2O_3$ | 0.5 | 302 | 91 |
| Example 14 | $Li_{1.2}Mn_{0.54}Co_{0.13}Ni_{0.13}O_{1.9}F_{0.1}$ | C2/m | 0.33 | $Al_2O_3$ | 1.0 | 291 | 92 |
| Example 15 | $Li_{1.2}Mn_{0.54}Co_{0.13}Ni_{0.13}O_{1.9}F_{0.1}$ | C2/m | 0.35 | ZnO | 0.5 | 299 | 91 |
| Example 16 | $Li_{1.2}Mn_{0.54}Co_{0.13}Ni_{0.13}O_{1.9}F_{0.1}$ | C2/m | 0.24 | $ZrO_2$ | 0.5 | 298 | 89 |
| Example 17 | $Li_{1.2}Mn_{0.54}Co_{0.13}Ni_{0.13}O_{1.9}F_{0.1}$ | C2/m | 0.28 | $TiO_2$ | 0.5 | 300 | 89 |
| Example 18 | $Li_{1.2}Mn_{0.54}Co_{0.13}Ni_{0.13}O_{1.9}F_{0.1}$ | C2/m | 0.35 | $SiO_2$ | 0.5 | 301 | 84 |
| Comparative Example 1 | $Li_{1.2}Mn_{0.8}O_{1.33}F_{0.67}$ | Fd-3m | 0.50 | — | — | 299 | 80 |
| Comparative Example 2 | $Li_{1.2}Mn_{0.4}Co_{0.4}O_{1.9}F_{0.1}$ | R-3m | 0.24 | — | — | 260 | 91 |
| Comparative Example 3 | $Li_{1.2}Mn_{0.54}Co_{0.13}Ni_{0.13}O_{1.9}F_{0.1}$ | C2/m | 0.30 | — | — | 295 | 81 | covering material (i.e., the thickness is 1.0 nm), for example, the generation of gas due to a side reaction of the lithium composite oxide and the electrolytic solution, the elimination of oxygen, and the generation of a side reaction product onto the surface of the positive electrode active material are further suppressed. Thus, the capacity retention after 20 cycles is improved.

As shown in Table 1, the battery in Example 1 has a higher initial discharge capacity than the batteries in Examples 3 to 6.

As shown in Table 1, the battery in Example 7 has a higher initial discharge capacity than the batteries in Examples 9 to 12.

As shown in Table 1, the battery in Example 13 has a higher initial discharge capacity than the batteries in Examples 15 to 18.

The reason for this is believed to be as follows. In the batteries in Example 1, Example 7, and Example 13, $Al_2O_3$ is used as a covering material. As a result, $Al_2O_3$ reacts with Li on the surface of the lithium composite oxide, thereby forming $LiAlO_2$. This improves the Li conductivity. Thus, the initial discharge capacity is improved.

As shown in Table 1, the batteries in Example 1 and Examples 3 to 6 have a higher initial discharge capacity than the battery in Comparative Example 1.

As shown in Table 1, the batteries in Example 13 and Examples 15 to 18 have a higher initial discharge capacity than the battery in Comparative Example 3.

The reason for this is believed to be as follows. In the batteries in Example 1, Examples 3 to 6, Example 13, and Examples 15 to 18, the direct contact between the surface of the lithium composite oxide and the electrolytic solution is suppressed by the coating film of the covering material, and thus the elimination of oxygen that contributes to the discharge capacity of the positive electrode active material is suppressed. This improves the Li conductivity and ameliorates the irreversibility of the charge-discharge reaction. Thus, the initial discharge capacity is improved.

On the other hand, as shown in Table 1, the batteries in Examples 7 to 12 have a lower initial discharge capacity than the battery in Comparative Example 2.

The reason for this is believed to be as follows. In the batteries in Examples 7 to 12, the Mn content and the fluorine content in the lithium composite oxide are relatively low, which increases the influence of the elimination of oxygen. Therefore, only the coating film of the covering material does not sufficiently suppress the elimination of oxygen. Furthermore, the surface of the lithium composite oxide becomes electrochemically inactive and the resistance increases, which decreases the Li conductivity. Thus, the initial discharge capacity is decreased.

Hereafter, Reference Examples will be described. The positive electrode active materials in Reference Examples below contain a lithium composite oxide but not the covering material according to the present disclosure.

Reference Example 1

LiF, $Li_2MnO_3$, and $LiMnO_2$ were weighed so as to have a molar ratio of Li/Mn/O/F=1.2/0.8/1.33/0.67.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffraction measurement.

The space group of the obtained precursor was Fm-3m.

The obtained precursor was then heat-treated in an air atmosphere at 500° C. for 2 hours.

The obtained positive electrode active material was subjected to powder X-ray diffraction measurement.

The obtained positive electrode active material was subjected to powder X-ray diffraction measurement and electron diffraction measurement to analyze the crystal structure.

The ratio $I_{(18°-20°)}/I_{(43°-46°)}$ of the obtained positive electrode active material was 0.50.

A coin battery in Reference Example 1 was produced in the same manner as in Example 1 using the obtained positive electrode active material.

Reference Example 2

LiF, $Li_2MnO_3$, $LiMnO_2$, and $LiCoO_2$ were weighed so as to have a molar ratio of Li/Mn/Co/O/F=1.2/0.4/0.4/1.9/0.1.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffraction measurement.

The space group of the obtained precursor was Fm-3m.

The obtained precursor was then heat-treated in an air atmosphere at 300° C. for 30 minutes.

The obtained positive electrode active material was subjected to powder X-ray diffraction measurement.

The obtained positive electrode active material was subjected to powder X-ray diffraction measurement and electron diffraction measurement to analyze the crystal structure.

The obtained positive electrode active material was a two-phase mixture including a phase that belongs to a space group Fm-3m and a phase that belongs to a space group R-3m.

The ratio $I_{(18°-20°)}/I_{(43°-46°)}$ of the obtained positive electrode active material was 0.24.

A coin battery in Reference Example 2 was produced in the same manner as in Reference Example 1 using the obtained positive electrode active material.

Reference Example 3

LiF, $Li_2MnO_3$, $LiMnO_2$, $LiCoO_2$, and $LiNiO_2$ were weighed so as to have a molar ratio of Li/Mn/Co/Ni/O/F=1.2/0.54/0.13/0.13/1.9/0.1.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffraction measurement.

The space group of the obtained precursor was Fm-3m.

The obtained precursor was then heat-treated in an air atmosphere at 500° C. for 30 minutes.

The obtained positive electrode active material was subjected to powder X-ray diffraction measurement.

The obtained positive electrode active material was subjected to powder X-ray diffraction measurement and electron diffraction measurement to analyze the crystal structure.

The obtained positive electrode active material was a two-phase mixture including a phase that belongs to a space group Fm-3m and a phase that belongs to a space group C2/m.

The ratio $I_{(18°-20°)}/I_{(43°-46°)}$ of the obtained positive electrode active material was 0.30.

A coin battery in Reference Example 3 was produced in the same manner as in Reference Example 1 using the obtained positive electrode active material.

Reference Examples 4 to 21

The raw materials and the mixing ratio of Li/Me/O/F were changed from those in Reference Example 1.

Furthermore, the heat treatment conditions were changed within 300° C. to 500° C. and 30 minutes to 2 hours from those in Reference Example 1.

Except for this, positive electrode active materials in Reference Examples 4 to 21 were synthesized in the same manner as in Reference Example 1.

Table 2 shows the average composition of each of the positive electrode active materials in Reference Examples 4 to 21.

Each of the positive electrode active materials in Reference Examples 4 to 21 was a two-phase mixture including a phase that belongs to a space group Fm-3m and a phase that belongs to a space group Fd-3m.

The raw materials in Reference Examples 4 to 21 were weighed on a stoichiometric basis and mixed with each other in the same manner as in Reference Example 1.

Coin batteries in Reference Examples 4 to 21 were produced in the same manner as in Reference Example 1 using the obtained positive electrode active materials in Reference Examples 4 to 21.

Reference Example 22

A positive electrode active material having a composition represented by $Li_{1.2}Mn_{0.54}Co_{0.13}N_{0.13}O_2$ was obtained in the same manner as in Reference Example 3.

Herein, LiF was not used as a raw material.

The obtained positive electrode active material was a two-phase mixture including a phase that belongs to a space group Fm-3m and a phase that belongs to a space group C2/m.

The ratio $I_{(18°-20°)}/I_{(43°-46°)}$ of the obtained positive electrode active material was 0.25.

A coin battery in Reference Example 22 was produced in the same manner as in Reference Example 1 using the obtained positive electrode active material.

Reference Example 23

A positive electrode active material having a composition represented by $LiCoO_2$ (lithium cobaltate) was obtained by a publicly known method.

The obtained positive electrode active material was subjected to powder X-ray diffraction measurement.

The space group of the obtained positive electrode active material was R-3m.

The ratio $I_{(18°-20°)}/I_{(43°-46°)}$ of the obtained positive electrode active material was 1.27.

A coin battery in Reference Example 23 was produced in the same manner as in Reference Example 1 using the obtained positive electrode active material.

Reference Example 24

A positive electrode active material having a composition represented by $Li_{1.2}Mn_{0.8}O_{1.67}F_{0.33}$ was obtained in the same manner as in Reference Example 1.

Herein, the heat treatment conditions were changed to 700° C. and 10 hours.

The obtained positive electrode active material was subjected to powder X-ray diffraction measurement.

The obtained positive electrode active material was subjected to powder X-ray diffraction measurement and electron diffraction measurement to analyze the crystal structure.

The obtained positive electrode active material was a two-phase mixture including a phase that belongs to a space group Fm-3m and a phase that belongs to a space group Fd-3m.

The ratio $I_{(18°-20°)}/I_{(43°-46°)}$ of the obtained positive electrode active material was 1.05.

A coin battery in Reference Example 24 was produced in the same manner as in Reference Example 1 using the obtained positive electrode active material.

Reference Example 25

A positive electrode active material having a composition represented by $Li_{1.2}Mn_{0.8}O_{1.67}F_{0.33}$ was obtained in the same manner as in Reference Example 1.

Herein, the heat treatment conditions were changed to 300° C. and 10 minutes.

The obtained positive electrode active material was subjected to powder X-ray diffraction measurement.

The obtained positive electrode active material was subjected to powder X-ray diffraction measurement and electron diffraction measurement to analyze the crystal structure.

The obtained positive electrode active material was a two-phase mixture including a phase that belongs to a space group Fm-3m and a phase that belongs to a space group Fd-3m.

The ratio $I_{(18°-20°)}/I_{(43°-46°)}$ of the obtained positive electrode active material was 0.02.

A coin battery in Reference Example 25 was produced in the same manner as in Reference Example 1 using the obtained positive electrode active material.

Evaluation of Battery

The current density at the positive electrode was set to 0.5 mA/cm² and the battery in Reference Example 1 was charged until the voltage reached 4.9 V.

Subsequently, the end-of-discharge voltage was set to 2.5 V and the battery in Reference Example 1 was discharged at a current density of 0.5 mA/cm².

The initial discharge capacity of the battery in Reference Example 1 was 299 mAh/g.

Furthermore, the current density at the positive electrode was set to 0.5 mA/cm² and the battery in Reference Example 23 was charged until the voltage reached 4.3 V.

Subsequently, the end-of-discharge voltage was set to 2.5 V and the battery in Reference Example 23 was discharged at a current density of 0.5 mA/cm².

The initial discharge capacity of the battery in Reference Example 23 was 150 mAh/g.

Furthermore, the initial discharge capacity of each of the coin batteries in Reference Examples 2 to 22 and Reference Examples 24 and 25 was measured.

Table 2 shows the results.

TABLE 2

|  | Average composition | x/y | α/β | (x + y)/(α + β) | Space group (other than Fm-3m) | $I_{(18°-20°)}/I_{(43°-46°)}$ | Initial discharge capacity (mAh/g) |
|---|---|---|---|---|---|---|---|
| Reference Example 1 | $Li_{1.2}Mn_{0.8}O_{1.33}F_{0.67}$ | 1.5 | 2 | 1.0 | Fd-3m | 0.50 | 299 |
| Reference Example 2 | $Li_{1.2}Mn_{0.4}Co_{0.4}O_{1.9}F_{0.1}$ | 1.5 | 19 | 1.0 | R-3m | 0.24 | 260 |
| Reference Example 3 | $Li_{1.2}Mn_{0.54}Co_{0.13}Ni_{0.13}O_{1.9}F_{0.1}$ | 1.5 | 19 | 1.0 | C2/m | 0.30 | 295 |
| Reference Example 4 | $Li_{1.2}Mn_{0.8}O_{1.33}F_{0.67}$ | 1.5 | 2 | 1.0 | Fd-3m | 0.70 | 282 |
| Reference Example 5 | $Li_{1.2}Mn_{0.8}O_{1.33}F_{0.67}$ | 1.5 | 2 | 1.0 | Fd-3m | 0.90 | 275 |
| Reference Example 6 | $Li_{1.2}Mn_{0.8}O_{1.33}F_{0.67}$ | 1.5 | 2 | 1.0 | Fd-3m | 0.05 | 269 |
| Reference Example 7 | $Li_{1.1}Mn_{0.8}O_{1.33}F_{0.67}$ | 1.38 | 2 | 0.95 | Fd-3m | 0.10 | 297 |
| Reference Example 8 | $Li_{1.2}Mn_{0.8}O_{1.9}F_{0.1}$ | 1.5 | 19 | 1.0 | Fd-3m | 0.37 | 277 |
| Reference Example 9 | $Li_{1.25}Mn_{0.75}O_{1.33}F_{0.67}$ | 1.67 | 2 | 1.0 | Fd-3m | 0.44 | 263 |
| Reference Example 10 | $Li_{1.2}Mn_{0.75}B_{0.05}O_{1.67}F_{0.33}$ | 1.5 | 5 | 1.0 | Fd-3m | 0.50 | 293 |
| Reference Example 11 | $Li_{1.2}Mn_{0.75}P_{0.05}O_{1.67}F_{0.33}$ | 1.5 | 5 | 1.0 | Fd-3m | 0.50 | 289 |
| Reference Example 12 | $Li_{1.2}Mn_{0.75}Al_{0.05}O_{1.67}F_{0.33}$ | 1.5 | 5 | 1.0 | Fd-3m | 0.50 | 290 |
| Reference Example 13 | $Li_{1.2}Mn_{0.75}Ti_{0.05}O_{1.67}F_{0.33}$ | 1.5 | 5 | 1.0 | Fd-3m | 0.50 | 289 |
| Reference Example 14 | $Li_{1.2}Mn_{0.75}Nb_{0.05}O_{1.67}F_{0.33}$ | 1.5 | 5 | 1.0 | Fd-3m | 0.50 | 281 |
| Reference Example 15 | $Li_{1.2}Mn_{0.75}W_{0.05}O_{1.67}F_{0.33}$ | 1.5 | 5 | 1.0 | Fd-3m | 0.50 | 279 |
| Reference Example 16 | $Li_{1.2}Mn_{0.75}V_{0.05}O_{1.67}F_{0.33}$ | 1.5 | 5 | 1.0 | Fd-3m | 0.50 | 284 |
| Reference Example 17 | $Li_{1.2}Mn_{0.75}Cr_{0.05}O_{1.67}F_{0.33}$ | 1.5 | 5 | 1.0 | Fd-3m | 0.50 | 285 |
| Reference Example 18 | $Li_{1.2}Mn_{0.75}Si_{0.05}O_{1.67}F_{0.33}$ | 1.5 | 5 | 1.0 | Fd-3m | 0.50 | 280 |
| Reference Example 19 | $Li_{1.2}Mn_{0.75}Fe_{0.05}O_{1.67}F_{0.33}$ | 1.5 | 5 | 1.0 | Fd-3m | 0.50 | 272 |
| Reference Example 20 | $Li_{1.2}Mn_{0.75}Cu_{0.05}O_{1.67}F_{0.33}$ | 1.5 | 5 | 1.0 | Fd-3m | 0.50 | 279 |
| Reference Example 21 | $Li_{1.2}Mn_{0.75}Ru_{0.05}O_{1.67}F_{0.33}$ | 1.5 | 5 | 1.0 | Fd-3m | 0.50 | 281 |
| Reference Example 22 | $Li_{1.2}Mn_{0.54}Co_{0.13}Ni_{0.13}O_2$ | 1.5 | — | 1.0 | C2/m | 0.25 | 272 |
| Reference Example 23 | $LiCoO_2$ | 1.0 | — | 1.0 | (R-3m) | 1.27 | 150 |
| Reference Example 24 | $Li_{1.2}Mn_{0.8}O_{1.67}F_{0.33}$ | 1.5 | 5 | 1.0 | Fd-3m | 1.05 | 254 |
| Reference Example 25 | $Li_{1.2}Mn_{0.8}O_{1.67}F_{0.33}$ | 1.5 | 5 | 1.0 | Fd-3m | 0.02 | 252 |

As shown in Table 2, the batteries in Reference Examples 1 to 22 have an initial discharge capacity of 260 to 299 mAh/g.

That is, the initial discharge capacity of the batteries in Reference Examples 1 to 22 is higher than the initial discharge capacity of the batteries in Reference Examples 23 to 25.

The reason for this is believed to be as follows. In the batteries in Reference Examples 1 to 22, the lithium composite oxide in the positive electrode active material includes a first phase having a crystal structure that belongs to a space group Fm-3m and a second phase having a crystal structure that belongs to a space group other than a space group Fm-3m, and $0.05 \leq I_{(18°-20°)}/I_{(43°-46°)} \leq 0.90$ is satisfied. Therefore, a large amount of Li can be intercalated and deintercalated, and the Li diffusibility and the stability of the crystal structure are high. Thus, the initial discharge capacity is considerably improved.

In Reference Example 23, the ratio $I_{(18°-20°)}/I_{(43°-46°)}$ is more than 0.90 ($I_{(18°-20°)}/I_{(43°-46°)}$=1.27). Only a single phase having a crystal structure that belongs to a space group R-3m is included, and a first phase having a crystal structure that belongs to a space group Fm-3m is not included. Thus, it is believed that the amount of Li intercalated and deintercalated during charge and discharge is decreased. Furthermore, x/y is relatively small (x/y=1.0). Therefore, it is believed that the amount of Li that can contribute to the reaction is decreased, which decreases the Li ion diffusibility. Thus, the initial discharge capacity is believed to be considerably decreased.

In Reference Example 24, the ratio $I_{(18°-20°)}/I_{(43°-46°)}$ is more than 0.90 ($I_{(18°-20°)}/I_{(43°-46°)}$=1.05). Therefore, it is believed that the existence ratio of the first phase decreases, which decreases the amount of Li intercalated and deintercalated during charge and discharge. It is also believed that a large number of interfaces are formed between the first phase and the second phase, which decreases the Li diffusibility. Thus, the initial discharge capacity is believed to be decreased.

In Reference Example 25, the ratio $I_{(18°-20°)}/I_{(43°-46°)}$ is less than 0.05 $I_{(18°-20°)}/I_{(43°-46°)}$=0.02). Therefore, it is believed that the existence ratio of the second phase decreases, which decreases the Li diffusibility. Thus, the initial discharge capacity is believed to be decreased.

As shown in Table 2, the initial discharge capacity of the battery in Reference Example 2 is lower than the initial discharge capacity of the battery in Reference Example 1.

The reason for this is believed to be as follows. In Reference Example 2, the second phase does not have a crystal structure that belongs to a space group Fd-3m, but has a crystal structure that belongs to a space group R-3m unlike in Reference Example 1. In the crystal structure (spinel structure) that belongs to a space group Fd-3m, a transition metal-anion octahedron serving as a pillar forms a three-dimensional network. On the other hand, in the crystal structure (layered structure) that belongs to a space group R-3m, a transition metal-anion octahedron serving as a pillar forms a two-dimensional network. Therefore, the crystal structure is destabilized, which decreases the initial discharge capacity.

As shown in Table 2, the initial discharge capacity of the battery in Reference Example 3 is lower than the initial discharge capacity of the battery in Reference Example 1.

The reason for this is believed to be as follows. In Reference Example 3, the second phase does not have a crystal structure that belongs to a space group Fd-3m, but has a crystal structure that belongs to a space group C2/m unlike in Reference Example 1. In the crystal structure (spinel structure) that belongs to a space group Fd-3m, a transition metal-anion octahedron serving as a pillar forms a three-dimensional network. On the other hand, in the crystal structure (layered structure) that belongs to a space group C2/m, a transition metal-anion octahedron serving as a pillar forms a two-dimensional network. Therefore, the crystal structure is destabilized, which decreases the initial discharge capacity.

As shown in Table 2, the initial discharge capacity of the battery in Reference Example 4 is lower than the initial discharge capacity of the battery in Reference Example 1.

The reason for this is believed to be as follows. The ratio $I_{(18°-20°)}/I_{(43°-46°)}$ is larger in Reference Example 4 ($I_{(18°-20°)}/I_{(43°-46°)}=0.70$) than in Reference Example 1. Therefore, the existence ratio of the first phase decreases, which decreases the amount of Li intercalated and deintercalated during charge and discharge. Furthermore, a large number of interfaces are formed between the first phase and the second phase, which decreases the Li diffusibility. Thus, the initial discharge capacity is decreased.

As shown in Table 2, the initial discharge capacity of the battery in Reference Example 5 is lower than the initial discharge capacity of the battery in Reference Example 4.

The reason for this is believed to be as follows. The ratio $I_{(18°-20°)}/I_{(43°-46°)}$ is larger in Reference Example 5 ($I_{(18°-20°)}/I_{(43°-46°)}=0.90$) than in Reference Example 4. Therefore, the existence ratio of the first phase decreases, which decreases the amount of Li intercalated and deintercalated during charge and discharge. Furthermore, a large number of interfaces are formed between the first phase and the second phase, which decreases the Li diffusibility. Thus, the initial discharge capacity is decreased.

As shown in Table 2, the initial discharge capacity of the battery in Reference Example 6 is lower than the initial discharge capacity of the battery in Reference Example 1.

The reason for this is believed to be as follows. The ratio $I_{(18°-20°)}/I_{(43°-46°)}$ is smaller in Reference Example 6 ($I_{(18°-20°)}/I_{(43°-46°)}=0.05$) than in Reference Example 1. Therefore, the existence ratio of the second phase decreases, which decreases the Li diffusibility. Thus, the initial discharge capacity is decreased.

As shown in Table 2, the initial discharge capacity of the battery in Reference Example 7 is lower than the initial discharge capacity of the battery in Reference Example 1.

The reason for this is believed to be as follows. The ratio x/y is smaller in Reference Example 7 (x/y=1.38) than in Reference Example 1. Therefore, the number of isolated lithium atoms increases in the crystal structure, which decreases the amount of Li that contributes to the reaction. This decreases the diffusibility of Li ions and thus decreases the initial discharge capacity.

As shown in Table 2, the initial discharge capacity of the battery in Reference Example 8 is lower than the initial discharge capacity of the battery in Reference Example 1.

The reason for this is believed to be as follows. The ratio α/β is larger in Reference Example 8 (α/β=19) than in Reference Example 1. That is, the influence of F, which has a high electronegativity, is decreased and electrons are delocalized, and thus the oxidation-reduction reaction of oxygen is facilitated. This causes elimination of oxygen and the structure is destabilized when Li is deintercalated. Thus, the initial discharge capacity is decreased.

As shown in Table 2, the initial discharge capacity of the battery in Reference Example 9 is lower than the initial discharge capacity of the battery in Reference Example 1.

The reason for this is believed to be as follows. The ratio x/y is larger in Reference Example 9 (x/y=1.67) than in Reference Example 1. Therefore, a larger amount of Li is deintercalated during charge and the structure is destabilized. Thus, the initial discharge capacity is decreased.

As shown in Table 2, the initial discharge capacity of the batteries in Reference Examples 10 to 21 is lower than the initial discharge capacity of the battery in Reference Example 1.

The reason for this is believed to be as follows. In Reference Examples 10 to 21, the amount of Mn having orbitals easily hybridized with those of oxygen is decreased by partly replacing Mn with another element compared with in Reference Example 1. This decreases the contribution of the oxidation-reduction reaction of oxygen, and the initial discharge capacity is decreased.

As shown in Table 2, the initial discharge capacity of the battery in Reference Example 22 is lower than the initial discharge capacity of the battery in Reference Example 3.

The reason for this is believed to be as follows. In Reference Example 22, the lithium composite oxide does not contain F. Therefore, oxygen is not partly replaced with F, which has a high electronegativity, and thus the cation-anion interaction is decreased. This destabilizes the crystal structure through the elimination of oxygen during charge at high voltage. Thus, the initial discharge capacity is decreased.

What is claimed is:
1. A positive electrode active material comprising:
a lithium composite oxide; and
a covering material that covers a surface of the lithium composite oxide,
wherein the covering material has an electron conductivity of $10^6$ S/m or less,
the lithium composite oxide is a multiphase mixture including a first phase having a first crystal structure that belongs to a space group Fm-3m and a second phase having a second crystal structure that belongs to a space group other than a space group Fm-3m, a ratio $I_{(18°-20°)}/I_{(43°-46°)}$ of a first integrated intensity $I_{(18°-20°)}$ of a first maximum peak present at a first diffraction angle 2θ of 18° or more and 20° or less to a second integrated intensity $I_{(43°-46°)}$ of a second maximum peak present at a second diffraction angle 2θ of 43° or more and 46° or less in an XRD pattern of the lithium composite oxide satisfies $0.05 \leq I_{(18°-20°)}/I_{(43°-46°)} \leq 0.90$, and an average composition of the lithium composite oxide is represented by a formula $Li_xMe_yO_\alpha Q_\beta$, where Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; Q is at least one selected from the group consisting of F, Cl, N, and S; and $1.05 \leq x \leq 1.4$, $0.6 \leq y \leq 0.95$, $1.2 \leq \alpha \leq 2$, and $0 \leq \beta \leq 0.8$.

2. The positive electrode active material according to claim 1,
wherein the covering material is an inorganic material.

3. The positive electrode active material according to claim 1,
wherein a mass ratio of the covering material to the lithium composite oxide is 0.2 or less.

4. The positive electrode active material according to claim 3,
wherein the mass ratio of the covering material to the lithium composite oxide is 0.01 or more and 0.1 or less.

5. The positive electrode active material according to claim 1,
wherein the covering material has a thickness of 0.1 nm or more and 2.0 nm or less.

6. The positive electrode active material according to claim 1,
wherein the covering material forms a solid solution with at least a part of the surface of the lithium composite oxide.

7. The positive electrode active material according to claim 1,
wherein the covering material is an oxide.

8. The positive electrode active material according to claim 7,
wherein the oxide is represented by a formula $Li_aA_bO_c$,
where A is at least one selected from the group consisting of Mn, Co, Ni, Fe, Cu, Nb, Mo, Ti, Al, Cr, Zr, Zn, Na, K, Ca, Mg, Pt, Au, B, P, Eu, Sm, Ce, and H; and $0 \leq a \leq 3$, $0.5 \leq b \leq 4$, and $1 \leq c \leq 4$.

9. The positive electrode active material according to claim 8,
wherein the oxide is at least one oxide selected from the group consisting of $Al_2O_3$, $ZrO_2$, $ZnO$, $TiO_2$, and $SiO_2$.

10. The positive electrode active material according to claim 1,
wherein the second crystal structure of the second phase belongs to at least one selected from the group consisting of space groups Fd-3m, R-3m, and C2/m.

11. The positive electrode active material according to claim 10,
wherein the second crystal structure of the second phase belongs to a space group Fd-3m.

12. The positive electrode active material according to claim 1,
wherein $0.10 \leq I_{(18°-20°)}/I_{(43°-46°)} \leq 0.70$.

13. The positive electrode active material according to claim 1,
wherein the lithium composite oxide contains manganese.

14. The positive electrode active material according to claim 1,
wherein the lithium composite oxide contains fluorine.

15. The positive electrode active material according to claim 1,
wherein $1.1 \leq x \leq 1.25$ and $0.75 \leq y \leq 0.8$.

16. The positive electrode active material according to claim 1,
wherein $1.33 \leq \alpha \leq 1.9$ and $0.1 \leq \beta \leq 0.67$.

17. The positive electrode active material according to claim 1,
wherein $2 \leq \alpha/\beta \leq 5$.

18. The positive electrode active material according to claim 1, further comprising the lithium composite oxide as a main component.

19. The positive electrode active material according to claim 1,
wherein the second crystal structure of the second phase belongs to a space group Fd-3m, R-3m, or C2/m, and
the lithium composite oxide is a two-phase mixture including the first phase and the second phase.

20. A battery comprising:
a positive electrode containing the positive electrode active material according to claim 1;
a negative electrode; and
an electrolyte.

21. The battery according to claim 20,
wherein the negative electrode contains:
a negative electrode active material that allows a lithium ion to be inserted therein and released therefrom; or
a material that allows lithium metal to be dissolved and deposited thereon, and the electrolyte is a nonaqueous electrolytic solution.

22. The battery according to claim 20,
wherein the negative electrode contains:
a negative electrode active material that allows a lithium ion to be inserted therein and released therefrom; or
a material that allows lithium metal to be dissolved and deposited thereon, and the electrolyte is a solid electrolyte.

* * * * *